(12) United States Patent
Iwaki et al.

(10) Patent No.: US 8,109,355 B2
(45) Date of Patent: Feb. 7, 2012

(54) HYDROSTATIC TRANSAXLE AND HYDRAULICALLY DRIVEN VEHICLE

(75) Inventors: Koji Iwaki, Hyogo (JP); Norihiro Ishii, Hyogo (JP); Fumitoshi Ishino, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 0 days.

(21) Appl. No.: 12/536,192

(22) Filed: Aug. 5, 2009

(65) Prior Publication Data

US 2009/0288901 A1 Nov. 26, 2009

Related U.S. Application Data

(63) Continuation of application No. 11/214,056, filed on Aug. 30, 2005, now Pat. No. 7,588,103.

(30) Foreign Application Priority Data

Sep. 2, 2004 (JP) .................................. 2004-256186
Jan. 31, 2005 (JP) .................................. 2005-23438

(51) Int. Cl.
*B60K 17/356* (2006.01)
(52) U.S. Cl. ............ 180/243; 180/305; 56/14.7; 56/202
(58) Field of Classification Search .................. 180/242, 180/243, 6.3, 6.24, 6.32, 6.48, 305, 306, 180/307, 308; 56/14.7, 202
See application file for complete search history.

(56) References Cited

U.S. PATENT DOCUMENTS

| | | |
|---|---|---|
| 3,690,398 A | 9/1972 | Hause |
| 4,140,196 A | 2/1979 | Brewer |
| 5,117,936 A | 6/1992 | Nakamura et al. |
| 5,159,992 A | 11/1992 | Reinecke et al. |
| 6,119,802 A | 9/2000 | Puett, Jr. |
| 6,135,231 A | 10/2000 | Reed |
| 6,390,227 B1 * | 5/2002 | Abend et al. .................. 180/375 |
| 6,619,038 B2 | 9/2003 | Takada et al. |

(Continued)

FOREIGN PATENT DOCUMENTS

EP 0 573 844 12/1993

(Continued)

OTHER PUBLICATIONS

European Search Report for counterpart European Application No. EP 05 10 7846, European Patent Office, Berlin, dated Feb. 7, 2006, 13 pages.

(Continued)

*Primary Examiner* — Anne Marie M Boehler
(74) *Attorney, Agent, or Firm* — Sterne, Kessler, Goldstein & Fox, P.L.L.C.

(57) ABSTRACT

A hydraulically driven vehicle comprises: a first transaxle disposed at one of front and rear portions of the vehicle, wherein the first transaxle incorporates a first hydraulic motor for driving a first axle; a second transaxle disposed at the other of the rear or front portion of the vehicle, wherein the second transaxle incorporates a second hydraulic motor for driving a second axle; a hydraulic pump for supplying fluid to the first and second hydraulic motors; a mower; a duct for transferring grass mowed by the mower, wherein the first transaxle is disposed above the duct; and a vertical power train interposed between the first axle and an axial center shaft of a wheel driven by the first axle, wherein the power train is disposed on a lateral outside of the duct.

12 Claims, 23 Drawing Sheets

U.S. PATENT DOCUMENTS

| | | |
|---|---|---|
| 6,807,809 B2 | 10/2004 | Schuh |
| 6,845,837 B2 | 1/2005 | Ohashi et al. |
| 6,926,111 B1 * | 8/2005 | Irikura ............ 180/234 |
| 7,047,715 B2 * | 5/2006 | Suhara et al. ............ 56/16.6 |
| 7,356,992 B2 | 4/2008 | Ivantysynova et al. |
| 7,503,161 B1 * | 3/2009 | Mizukawa et al. ............ 56/14.7 |
| 7,588,103 B2 | 9/2009 | Iwaki et al. |
| 2003/0182914 A1 | 10/2003 | Shibata et al. |
| 2004/0112027 A1 * | 6/2004 | Komorida et al. ............ 56/202 |
| 2004/0134704 A1 | 7/2004 | Okada et al. |
| 2005/0121249 A1 | 6/2005 | Iwaki et al. |
| 2006/0278459 A1 | 12/2006 | Iwaki et al. |

FOREIGN PATENT DOCUMENTS

| | | |
|---|---|---|
| EP | 0 916 541 | 5/1999 |
| FR | 2 797 375 | 2/2001 |
| JP | H02-91024 | 7/1990 |
| JP | H02-109759 | 9/1990 |
| JP | 06-183274 | 7/1994 |
| JP | 07-156675 | 6/1995 |
| JP | 11 034676 | 2/1999 |
| JP | 2000-001127 | 1/2000 |
| JP | 2000-108699 | 4/2000 |
| JP | 2000-300036 | 10/2000 |
| JP | 2002-295639 | 10/2002 |
| JP | 2003-079203 | 3/2003 |
| JP | 2003-180114 | 7/2003 |
| JP | 2004-210215 | 4/2004 |
| JP | 2005/035402 | 2/2005 |
| WO | WO 01/38119 | 5/2001 |
| WO | WO 2004/062956 | 7/2004 |

OTHER PUBLICATIONS

Notification of Reasons for Refusal for JP Application No. JP 2005-023438, mailed Dec. 21, 2010, 8 pages.

* cited by examiner

HYDROSTATIC TRANSAXLE AND HYDRAULICALLY DRIVEN VEHICLE

CROSS REFERENCE TO RELATED APPLICATION

This application is a continuation of U.S. application Ser. No. 11/214,056, filed Aug. 30, 2005, now U.S. Pat. No. 7,588,103, the entire disclosure of which is incorporated herein by reference.

BACKGROUND OF THE INVENTION

1. Field of the Invention

The present invention relates to a hydrostatic transaxle, which supports a pair of left and right steerable drive wheels, and incorporates a pair of hydraulic motors for driving the respective drive wheels. Further, the present invention relates to a hydraulically driven vehicle, which comprises a common hydraulic pressure source and at least two hydraulic motors connected in series to the common hydraulic pressure source, wherein one of the at least two hydraulic motors drives front drive wheels (or a front drive wheel), and the other drives rear drive wheels (or a rear drive wheel).

2. Related Art

Conventionally, as disclosed in International Publication WO 2004/062956, there is a well-known hydraulically driven vehicle having a main transaxle and an auxiliary transaxle. The main transaxle supports main drive wheels, and comprises a hydraulic motor for driving the main drive wheels. The auxiliary transaxle supports a pair of auxiliary drive wheels, and comprises a pair of hydraulic motors for driving the respective auxiliary drive wheels. The vehicle has a hydraulic circuit fluidly connecting the hydraulic motors of the main and auxiliary transaxles to a hydraulic pump. In the hydraulic circuit, the hydraulic motor of the main transaxle and the pair of hydraulic motors of the auxiliary transaxle are connected in series to the hydraulic pump, and the hydraulic motors of the auxiliary transaxle are connected to the hydraulic pump in parallel to each other.

The left and right auxiliary drive wheels are steerable wheels. Both of the hydraulic motors of the auxiliary transaxle are variable in displacement so as to prevent drag of the steerable wheels or the main drive wheels. The hydraulic motors of the auxiliary transaxle are provided with respective movable swash plates moved according to steering operation of the vehicle, or according to change of left or right turning angle of the steerable wheels, so as to change rotary speed of the steerable wheels, i.e., generate difference between the main drive wheels and the auxiliary drive wheels, according to change of the left or right turning angle of the vehicle. However, the link mechanism for moving the two movable swash plates according to the turning of the steerable wheels is complicated, and expanded so as to reduce spaces for other parts. Further, the link mechanism requires a large operation force because of its small operational efficiency.

Further, the conventional vehicle is set so that peripheral speed of the front drive wheels becomes equal to peripheral speed of the rear drive wheels during straight traveling. However, there is a problem that the peripheral speed of the drive wheel may be unexpectedly reduced because of bad road condition so as to be slower than that corresponding to the amount of fluid flowing through the corresponding hydraulic motor, thereby causing stiff traveling of the vehicle.

Further, with respect to the conventional hydraulically driven vehicle, as disclosed in International Publication WO 2004/062956, the main transaxle is expanded because it incorporates the hydraulic pump together with the hydraulic motor for driving the main drive wheels. Such a large-size transaxle may reduce variation of adaptable vehicles in size. Further, a pump shaft of the hydraulic pump projects outward from the transaxle so as to be provided thereon with a cooling fan. The expansion of the transaxle means that the area of the transaxle blown by cooling wind generated from the cooling fan becomes small relative to the transaxle. Besides, to efficiently cool fluid circulating in the HST fluid circuit having the series connection of the hydraulic motor for the main drive wheels and the pair of hydraulic motors for the auxiliary drive wheels to the hydraulic pump, it is advantageous that pipes for circulating fluid are blown by cooling wind generated from the cooling fan. However, it is difficult to concentrating the pipes adjacent to the cooling fan of the large-size transaxle. In this way, the conventional combination of the main transaxle incorporating the hydraulic pump and the hydraulic motor for driving the main drive wheels with the auxiliary transaxle incorporating the pair of hydraulic motors for driving the auxiliary drive wheels cannot ensure sufficient cooling efficiency for the HST fluid circuit.

SUMMARY OF THE INVENTION

A first object of the present invention is to provide a hydrostatic transaxle supporting a pair of left and right steerable drive wheels and comprising a pair of hydraulic motors for driving the respective drive wheels, wherein the hydrostatic transaxle is provided with a simple and compact link mechanism for controlling displacement of the hydraulic motors during turning of a vehicle.

To achieve the first object, a hydrostatic transaxle according to a first aspect of the present invention comprises: a transaxle casing; a pair of left and right axles disposed in the transaxle casing; a pair of hydraulic motors for driving the respective axles; and a pair of left and right steerable drive wheels disposed on left and right outsides of the transaxle casing so as to be drivingly connected to the respective axles. The hydraulic motors are disposed in the housing so as to be fluidly connected to a common hydraulic pressure source in parallel to each other. One of the hydraulic motors is a fixed displacement hydraulic motor, and the other is a variable displacement hydraulic motor, so that displacement of the variable displacement hydraulic motor is changed according to change of steered angles of the drive wheels.

Due to the construction, the change of steered angles of the drive wheels does not have to be transmitted to a fixed swash plate or another fixed displacement-setting member of the fixed displacement hydraulic motor. Therefore, a link mechanism for moving a movable swash plate or another variable displacement-setting member of the variable displacement hydraulic motor according to change of turning angle of the vehicle can be simple and compact in comparison with the conventional type transaxle having a pair of variable displacement hydraulic motors, thereby expanding a space around the hydrostatic transaxle for arrangement of other members, and increasing variation of layout in the vehicle. Further, when the displacement of the variable displacement hydraulic motor is reduced during turning of the vehicle so as to increase peripheral speed of the drive wheel driven by the variable displacement hydraulic motor, peripheral speed of the drive wheel driven by the fixed displacement hydraulic motor is also increased according to the increase of peripheral speed of the drive wheel driven by the variable displacement hydraulic motor so as to ensure smooth turning of the vehicle without drag of the drive wheels while keeping proper driving force.

In the first aspect, preferably, a pair of left and right steerable casings are relatively horizontally rotatably attached onto respective left and right ends of the transaxle casing so as to support the respective drive wheels, thereby making the drive wheels steerable. The variable displacement hydraulic motor is provided with a displacement control section for controlling displacement of the variable displacement hydraulic motor. The displacement control section is connected to a rod extended from one of the steerable casings so as to enable the change of displacement of the variable displacement hydraulic motor according to change of steered angles of the drive wheels.

Since the displacement control section changes the displacement of the variable displacement hydraulic motor correspondingly to the change of steered angles of the drive wheels, the rod does not have to be extended adjacent to the steerable casing supporting the drive wheel driven by the fixed displacement hydraulic motor, thereby ensuring a large space for arrangement of another member, such as a hydraulic fluid port for fluidly connecting the pair of hydraulic motors to the hydraulic pressure source.

Therefore, preferably, the displacement control section of the variable displacement hydraulic motor and a hydraulic fluid port for fluidly connecting the pair of hydraulic motors to the hydraulic pressure source are juxtaposed on an outer surface of the transaxle casing incorporating the pair of hydraulic motors. Due to this layout, the hydrostatic transaxle can be entirely minimized and the hydraulic fluid port can be disposed at a suitable position for piping.

The variable displacement hydraulic motor with the movable swash plate requires a cam mechanism for converting axial (push-and-pull) movement of the rod to the rotary movement of the movable swash plate. If both the hydraulic motors in the transaxle were variable displacement hydraulic motors with respective movable swash plates, the hydraulic motors would require a complicated cam mechanism for converting the axial movement of the rod extended from one of the steerable casings to the rotary movements of the two movable swash plates. However, in the transaxle according to the first aspect of the present invention, the variable displacement hydraulic motor and the fixed displacement hydraulic motor are provided, and only the variable displacement hydraulic motor has the displacement control section requiring such a cam mechanism. Therefore, the cam mechanism can be compact and reduce a space for arrangement thereof. Preferably, the cam mechanism of the displacement control section can be simply constituted by a cam member rotated by axial movement of the rod, and a rotary member contacting the cam member so as to be rotated integrally with a movable swash plate of the variable displacement hydraulic motor according to rotation of the cam member.

Preferably, a pin is provided on the steerable casing from which the rod is extended, and a tie rod connected to the other steerable casing and the rod connected to the displacement control section are pivoted on the pin, thereby reducing the number of component parts, and preventing the rod and the tie rod from crossing so as to hinder each other and hinder movement of the steerable casings.

In the first aspect, preferably, the transaxle casing comprises: a pair of left and right axle casings incorporating the respective axles; and a motor casing incorporating the pair of hydraulic motors. The motor casing is removably interposed between the left and right axle casings. Therefore, the motor casing with the pair of hydraulic motors therein can be removed from the axle casings for easy maintenance of the pair of hydraulic motors. Further, a spacer can be easily disposed between the axle casing and the motor casing so as to ensure a required tread between left and right drive wheels.

In the first aspect, preferably, a center pin bracket is removably attached to the transaxle casing so as to swingably suspend the transaxle casing from a vehicle frame. Therefore, different center pin brackets are prepared so that, even if a positional relation of the transaxle casing to a center pin changes due to change of a vehicle, a suitable center pin bracket can be selected so as to suitably equip the transaxle casing on the target vehicle. In this way, the transaxle can be standardized for various vehicles. Similarly, an arm for operatively connecting the steerable casing to a steering operation device on a vehicle may be removably attached to the steerable casing.

To achieve the first object, a hydrostatic transaxle according to a second aspect of the present invention comprises: a transaxle casing; a pair of left and right axles disposed in the transaxle casing; a pair of hydraulic motors for driving the respective axles being disposed in the housing so as to be fluidly connected to a common hydraulic pressure source in parallel to each other; and a pair of left and right steerable drive wheels disposed on left and right outsides of the transaxle casing so as to be drivingly connected to the respective axles. Both the hydraulic motors are fixed displacement hydraulic motors.

Therefore, the hydrostatic transaxle requires no link mechanism for moving swash plates of the hydraulic motors according to steering rotation of the steerable casings, thereby being compact and economical, and ensuring a large freedom degree of piping for supplying fluid to the hydraulic motors. If a vehicle does not require difference of peripheral speed between front wheels and rear wheels during turning of the vehicle because the front wheels and the rear wheels are equally distant from the turning center of the vehicle or for another reason, this hydrostatic transaxle is thoroughly applicable. Even if a vehicle employing this hydrostatic transaxle requires difference of peripheral speed between front wheels and rear wheels during turning of the vehicle, the vehicle can turn smoothly so as to give a feeling of two-wheel drive by employing later-discussed setting of peripheral speeds of front and rear wheels.

A second object of the present invention is to provide a hydraulically driven vehicle, comprising: a first drive wheel disposed at one of front and rear portions of the vehicle; a second drive wheel disposed at the other rear or front portion of the vehicle; first and second hydraulic motors for driving the respective first and second drive wheels; a common hydraulic pump; and a hydraulic circuit fluidly connecting the first and second hydraulic motors in series to the hydraulic pump, smoothened in straight-traveling thereof.

To achieve the second object, a hydraulically driven vehicle according to a third aspect of the present invention comprises: a first drive wheel disposed at one of front and rear portions of the vehicle; a second drive wheel disposed at the other rear or front portion of the vehicle; a first hydraulic motor for driving the first drive wheel; a second hydraulic motor for driving the second drive wheel; a common hydraulic pump for supplying fluid to the first and second hydraulic motors; and a hydraulic circuit fluidly connecting the first and second hydraulic motors in series to the hydraulic pump. Peripheral speed of the first drive wheel is set to be equal to peripheral speed of the second drive wheel, or to be slightly larger than peripheral speed of the second drive wheel, during straight traveling of the vehicle. The hydraulic circuit includes a supply portion from which fluid is supplied to the second hydraulic motor. A check valve is disposed in the supply portion so as to introduce fluid into the hydraulic circuit from outside of the hydraulic circuit.

Therefore, during straight traveling of the vehicle, even if the peripheral speed of the first drive wheel is reduced relative to a set output of the first hydraulic motor due to bad road condition, the peripheral speed of the first drive wheel can be kept to be equal to the peripheral speed of the second drive wheel, or larger than the peripheral speed of the second drive wheel, so that the second drive wheel may be rotated according to rotation of the first drive wheel, however, the first drive wheel is hardly rotated according to rotation of the second drive wheel, thereby canceling stiffness in straight traveling caused by the phenomenon that peripheral speeds of the first and second drive wheels alternately exceed each other. However, due to this peripheral speed setting of the first and second drive wheels, a suction port of the second hydraulic motor tends to be hydraulically depressed so as to reduce drive efficiency of the second hydraulic motor. This problem is solved by the check valve, which is disposed in the supply portion of the hydraulic circuit for supplying fluid to the second hydraulic motor so as to introduce fluid into the hydraulic circuit from outside of the hydraulic circuit, thereby ensuring a proper drive condition of the second hydraulic motor. Further, by using the configuration of the third aspect, a drive mode of the vehicle can be automatically switched between a normal drive mode of the vehicle by substantially driving only the first drive wheel and an emergency drive mode of the vehicle by driving both the first and second drive wheels when slipping of the first drive wheel is detected. That is, if the vehicle has a pair of left and right first drive wheels and a pair of left and right second drive wheels, the vehicle can be configured so that a two-wheel drive mode depending on driving the first drive wheels is set for normal traveling of the vehicle, and a four-wheel drive mode depending on driving the first and second drive wheels is automatically set when slipping of the first wheel or wheels is detected. Therefore, the vehicle can save energy cost at its work of light-load traction and reduce wear of tires of the first and second drive wheels.

In the third aspect, preferably, the hydraulic circuit is configured so that fluid delivered from the hydraulic pump circulates in the hydraulic circuit so as to pass the second hydraulic motor after passing the first hydraulic motor. Therefore, if the second drive wheel is stuck (in a ditch), or if the vehicle weight applied on the first drive wheel exceeds the vehicle weight applied on the second drive wheel because of traveling of the vehicle on a slope, the first hydraulic motor supplied with fluid from the hydraulic pump prior to the second hydraulic motor can be effectively driven so that, by driving the first drive wheel, the vehicle can travel on the slop smoothly or escape from being stuck.

Alternatively, in the third aspect, preferably, the hydraulic circuit is configured so that fluid delivered from the hydraulic pump circulates in the hydraulic circuit so as to pass the first hydraulic motor after passing the second hydraulic motor. Therefore, if the first drive wheel is stuck (in a ditch), or if the vehicle weight applied on the second drive wheel exceeds the vehicle weight applied on the first drive wheel because of traveling of the vehicle on a slope, the second hydraulic motor supplied with fluid from the hydraulic pump prior to the first hydraulic motor can be effectively driven so that, by driving the second drive wheel, the vehicle can travel on the slop smoothly or escape from being stuck.

To achieve the second object, a hydraulically driven vehicle according to a fourth aspect of the present invention comprises: a first drive wheel disposed at one of front and rear portions of the vehicle; a pair of second steerable drive wheels disposed at the other rear or front portion of the vehicle; a first fixed displacement hydraulic motor for driving the first drive wheel; a pair of second fixed displacement hydraulic motors for driving the respective second drive wheels; a common hydraulic pump for supplying fluid to the first hydraulic motor and the pair of second hydraulic motors; and a hydraulic circuit fluidly connecting the first hydraulic motor and the pair of second hydraulic motors in series to the hydraulic pump, and fluidly connecting the second hydraulic motors to the hydraulic pump in parallel to each other. Peripheral speed of the first drive wheel is set to be equal to peripheral speeds of the second drive wheels, or to be slightly larger than peripheral speeds of the second drive wheels, during straight traveling of the vehicle. The hydraulic circuit includes a supply portion from which fluid is supplied to the pair of second hydraulic motors. A check valve is disposed in the supply portion so as to introduce fluid into the hydraulic circuit from outside of the hydraulic circuit.

The second fixed displacement hydraulic motors fluidly connected to the hydraulic pump in parallel to each other require no link mechanism for moving swash plates (or other displacement-setting members) of the second hydraulic motors according to change of steered angles of the second steerable drive wheels. Therefore, a drive system for driving the second drive wheels can be simple, compact, and economical. Further, due to the peripheral speed setting of the first and second drive wheels, the stiffness in straight traveling can be canceled. In this peripheral speed setting condition, the check valve can supply fluid to suction ports of the second hydraulic motors which tend to be hydraulically depressed, thereby ensuring proper drive condition of the second hydraulic motors. Even while both the second hydraulic motors are fixed in displacement, the peripheral speed setting of the first and second drive wheels during straight traveling of the vehicle causes the second steerable drive wheels to be rotated according to rotation of the first drive wheel so as to prevent drag of the second steerable drive wheels during turning of the vehicle, whereby the vehicle can turn as smoothly as a four-wheel drive vehicle set in a two-wheel drive mode. Since both the second hydraulic motors are fixed in displacement, the vehicle in turning can obtain drive force which is substantially equal to that ensured by a three-wheel drive mode, because the second drive wheel disposed on the distal side of turning circle of the vehicle is driven by pressure from the contacting ground surface.

A third object of the present invention is to provide a hydraulically driven vehicle comprising two front and rear transaxles incorporating respective hydraulic motors for driving respective axles, wherein one of the front and rear transaxles, which conventionally incorporates a hydraulic pump together with the hydraulic motor, is minimized, and wherein the transaxles and a hydraulic circuit for driving the hydraulic motors is effectively cooled.

To achieve the third object, a hydraulically driven vehicle according to a fifth aspect of the present invention comprises: front and rear transaxles incorporating respective hydraulic motors for driving respective axles; and a hydraulic pump unit for supplying the front and rear transaxles. The hydraulic pump unit is disposed separately from the front and rear transaxles. Therefore, one of the front and rear transaxles, which conventionally incorporates a hydraulic pump together with the hydraulic motor, is minimized so as to enhance its applicability range for variable vehicles.

In the fifth aspect, preferably, the vehicle further comprises: a vehicle frame; and an engine for driving the hydraulic pump unit. Both the engine and the hydraulic pump unit are vibro-isolatingly mounted on the vehicle frame. Vibroisolation of the hydraulic pump unit can be ensured easily together with the engine so as to silence the vehicle.

In the fifth aspect, preferably, the hydraulic pump unit comprises a cooling fan. In comparison with a cooling fan provided on the conventional large transaxle incorporating both hydraulic pump and motor, the cooling fan of the hydraulic pump unit can be combined with the following configuration so as to improve efficiency of cooling the hydraulic pump unit, the front and rear transaxles and a hydraulic circuit comprising the hydraulic pump and motors, thereby prolonging lives of the hydraulic pump and motors, and improving the mechanical efficiency.

In the situation that the hydraulic pump unit comprises the cooling fan, preferably, at least one of the front and rear transaxles is disposed in an area blown by cooling wind generated from the cooling fan of the hydraulic pump unit, thereby being sufficiently cooled by the cooling fan.

Since pipes for circulating fluid supplied to the hydraulic motors can be concentrated around the compact hydraulic pump unit, preferably, a pipe for circulating fluid supplied to the first and second hydraulic motors is partly disposed in an area blown by cooling wind generated from the cooling fan of the hydraulic pump unit, thereby effectively cooling hydraulic fluid and improving operational reliability and endurance of the hydraulic pump and motors.

Further preferably, a reservoir tank is disposed adjacent to the hydraulic pump unit, and a pipe connecting the reservoir tank to at least one of the hydraulic pump unit and the first and second transaxles is disposed in an area blown by cooling wind generated from the cooling fan of the hydraulic pump unit. Therefore, fluid in the reservoir tank can also be effectively cooled so as to further improve efficiency of cooling fluid circulating between the hydraulic pump and motors.

In the fifth aspect, preferably, the hydraulic pump unit is disposed between the front and rear transaxles. Alternatively, preferably, one of the front and rear transaxles is disposed between the hydraulic pump unit and the other transaxle. Therefore, for example, pipes extended from both the transaxles to the hydraulic pump unit can be efficiently concentrated so as to be effectively cooled by the cooling fan of the hydraulic pump unit. Further, due to the arrangement of one of the front and rear transaxles between the hydraulic pump unit and the other rear or front transaxle, the front and rear transaxles can approach each other so as to shorten a pipe or pipes therebetween.

In the fifth aspect, preferably, in the hydraulically driven vehicle further comprising: a mower; and a duct for transferring grass mowed by the mower, one of the front and rear transaxles is disposed laterally eccentrically toward one of left and right sides of the vehicle, and the duct is disposed laterally eccentrically toward the other right or left side of the vehicle. Alternatively, preferably, one of the front and rear transaxles is disposed above the duct, and a vertical power train is disposed on lateral outside of the duct so as to be interposed between the axle of the transaxle above the duct and an axial center shaft of a wheel driven by the axle of the transaxle above the duct. Therefore, enough capacity of the duct can be ensured so as to prevent the duct from being clogged with mowed wet grass.

These, further and other objects, features and advantages will appear more fully from the following description with reference to accompanying drawings.

DETAILED DESCRIPTION OF THE INVENTION

Figure 1:
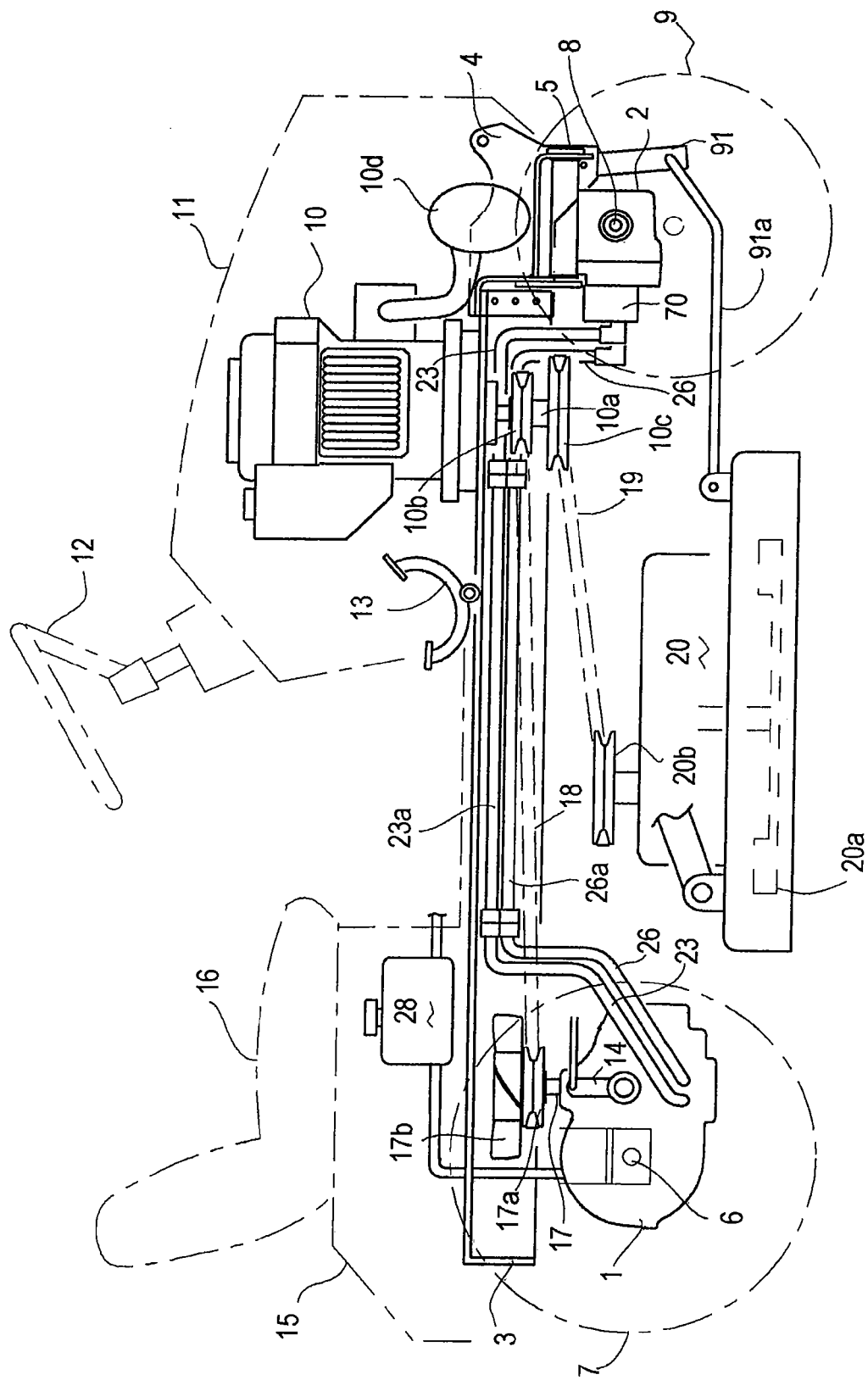
FIG. 1 is a side view of a four-wheel drive lawn tractor serving as a hydraulically driven vehicle according to a first embodiment of the present invention.
Figure 2:
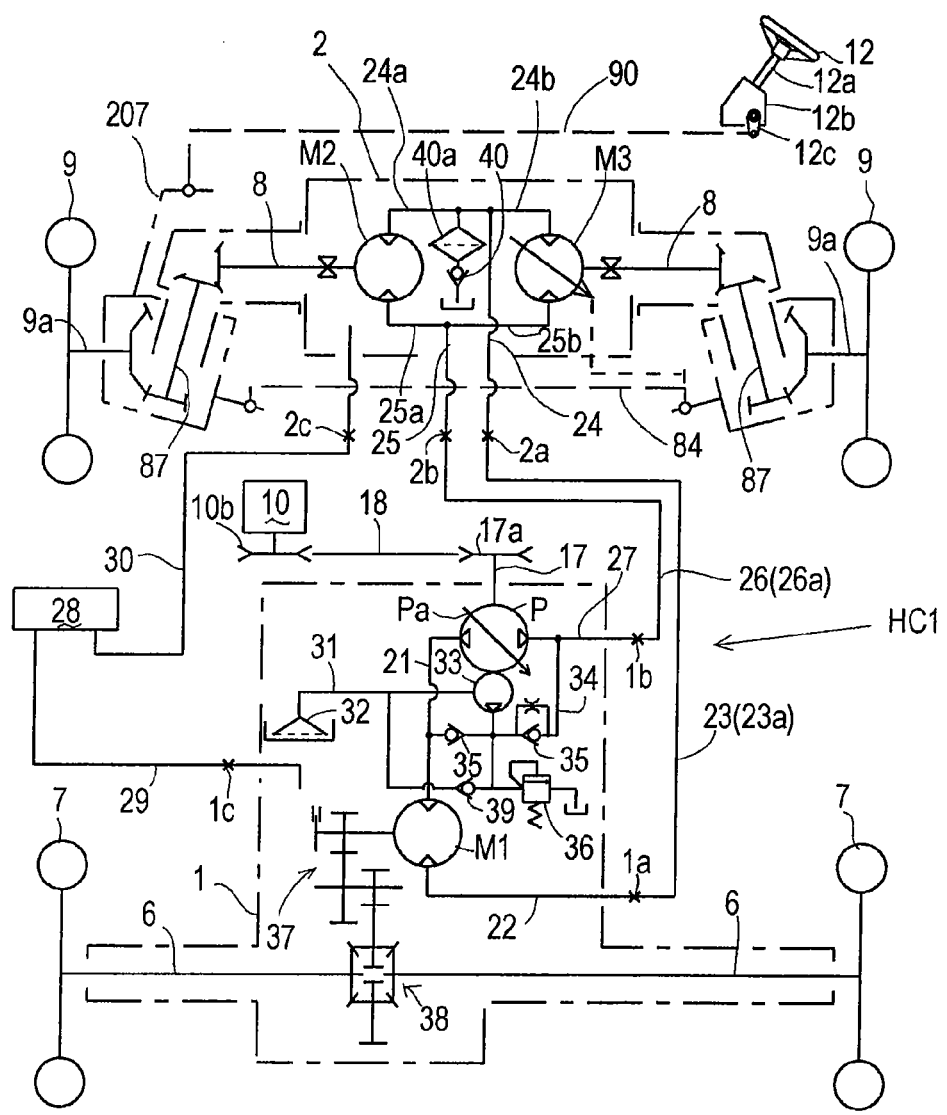
FIG. 2 is a skeleton diagram showing a hydraulic circuit and a structure for driving front and rear transaxles equipped on the vehicle of FIG. 1, wherein the front transaxle incorporates a combination of a variable displacement hydraulic motor and a fixed displacement hydraulic motor.

Referring to FIGS. 1 and 2, description will be given of a lawn tractor employing an Ackerman type front wheel steering system, serving as a hydraulically driven four-wheel drive vehicle according to a first embodiment of the present invention. The lawn tractor has a vehicle frame 3, which supports a rear transaxle 1 below a front portion thereof. A bracket 4 is fixed onto a front bottom portion of vehicle frame 3. A front transaxle 2 is suspended from bracket 4 via a fore-and-aft horizontal center pin 5 so that left and right ends of front transaxle 2 are vertically swingable. Rear transaxle 1 journals left and right opposite axles 6, which project laterally outward from rear transaxle 1 so as to be fixed at outer ends thereof to respective center portions of rear wheels 7. Front transaxle 2 journals left and right opposite axles 8, which project laterally outward from front transaxle 2 so as to be steerably and drivingly connected at outer ends thereof to respective center portions of front wheels 9.

An engine 10 is vibro-isolatingly supported on a front upper portion of vehicle frame 3 via vibro-isolating rubbers or the like, and covered with a bonnet 11. A steering wheel 12 is extended upwardly rearward at a rear end of bonnet 11, and a speed change pedal 13 is disposed at the bottom portion of the rear end of bonnet 11. Speed change pedal 13 is shaped like a seesaw such as to have a front portion depressed for setting forward traveling speed and a rear portion depressed for setting backward traveling speed. Speed change pedal 13 is linked to a speed change lever 14 pivoted on a casing of rear transaxle 1. A rear cover 15 is mounted on a rear upper portion of vehicle frame 3. A reservoir tank 28 is disposed in rear cover 15. A driver's seat 16 is mounted on rear cover 15.

Engine 10 has a downwardly vertical output shaft 10a on which pulleys 10b and 10c are fixed. An input shaft 17 (serving as a pump shaft of a later-discussed hydraulic pump P) projects upward from the casing of rear transaxle 1. A belt 18 is interposed between a pulley 17a fixed on input shaft 17 and pulley 10b on engine output shaft 10a, so as to drivingly connect hydraulic pump P in rear transaxle 1 to engine 10. Further, a cooling fan 17b is fixed on input shaft 17 so as to blow cooling air to the casing of rear transaxle 1.

A mower 20 is vertically movably suspended below vehicle frame 3 between front wheels 7 and rear wheels 9. An input pulley 20b is disposed on a top of mower 20. A belt 19 is interposed between pulley 10c on engine output shaft 10a and input pulley 20b so as to drivingly connect a rotary blade 20a in mower 20 to engine 10.

Hydraulic pump P, and hydraulic motor M1 for driving rear wheels 7 (axles 6) are disposed in the casing of rear transaxle 1. On the other hand, a pair of hydraulic motors M2 and M3 for driving respective left and right front wheels 9 (axles 8) are disposed in a casing of front transaxle 2. HST fluid pipes 23 and 26 including respective intermediate flexible hydraulic fluid hoses 23a and 26a are interposed between the casings of front and rear transaxles 1 and 2 so as to constitute an HST circuit HC1 including hydraulic pump P and hydraulic motors M1, M2 and M3.

HST circuit HC1 will be described with reference to FIG. 2. The casing of rear transaxle 1 has outwardly opened HST fluid ports 1a and 1b, and the casing of front transaxle 2 has outwardly opened HST fluid ports 2a and 2b. Pipe 23 including hose 23a is interposed between ports 1a and 2a, and pipe 26 including hose 26a is interposed between ports 1b and 2b.

In the casing of rear transaxle 1, a fluid passage 21 is interposed between hydraulic pump P and hydraulic motor M1, a fluid passage 27 is interposed between hydraulic pump P and port 1b, and a fluid passage 22 is interposed between hydraulic motor M1 and port 1a.

In the casing of front transaxle 2, hydraulic motor M2 is fixed in displacement, and hydraulic motor M3 is variable in displacement. In the casing of front transaxle 2, a fluid passage 24 is extended from port 2a toward hydraulic motors M2 and M3, and a fluid passage 25 is extended from port 2b toward hydraulic motors M2 and M3. Fluid passage 24 bifurcates into a fluid passage 24a connected to hydraulic motor M2 and a fluid passage 24b connected to hydraulic motor M3. Fluid passage 25 bifurcates into a fluid passage 25a connected to hydraulic motor M2 and a fluid passage 25b connected to hydraulic motor M3.

In HST circuit HC1, hydraulic motor M1 of rear transaxle 1 and the pair of hydraulic motors M2 and M3 of front transaxle 2 are connected in series to hydraulic pump P. Hydraulic motors M2 and M3 in front transaxle 2 are fluidly connected to hydraulic pump P in parallel to each other so as to be rotatable relative to each other according to conditions of load or the like.

In HST circuit HC1, during forward traveling of the vehicle, fluid delivered from hydraulic pump P flows through fluid passage 21, hydraulic motor M1, hydraulic passage 22, port 1a, pipe 23, port 2a, fluid passage 24, the pair of hydraulic motors M2 and M3, fluid passage 25, port 2b, pipe 26, port 1b, and fluid passage 27, so as to return to hydraulic pump P. In other words, during forward traveling of the vehicle, pressurized fluid from hydraulic pump P is supplied to hydraulic motor M1 of rear transaxle 1 before the pair of hydraulic motors M2 and M3 of front transaxle 2. During backward traveling of the vehicle, the fluid circulation route in HST circuit HC1 is reversed, that is, pressurized fluid from hydraulic pump P is supplied to the pair of hydraulic motors M2 and M3 of front transaxle 2 before hydraulic motor M1 of rear transaxle 1.

Of course, forward traveling is more frequent than backward traveling. It is now assumed that the circulation route in HST circuit HC1 during each of forward and backward travels is opposite to the above-mentioned route. On the assumption, when the vehicle climbing over a step is caught on the step and front wheels 9 are stuck, hydraulic motor M1 of rear transaxle 1 cannot be supplied with fluid through hydraulic motors M2 and M3 of front transaxle 2, whereby rear wheels 7 also stop. For this reason, the vehicle may stop every time it climbs over a step. Considering this problem, actual HST circuit HC1 is constructed as mentioned above so that fluid from hydraulic pump P is supplied to hydraulic motor M1 before hydraulic motors M2 and M3. Therefore, even if front wheels are stuck, hydraulic motor M1 is supplied with fluid from hydraulic pump P so as to drive rear wheels 7, thereby canceling the stuck condition of front wheels 9.

Additionally, a drive-mode setting valve may be interposed across pipes 23 and 26 between transaxles 1 and 2. The drive-mode setting valve is opened so as to complete connection between ports 1a and 2a and between ports 1b and 2b, thereby putting the vehicle into a four-wheel drive mode where fluid from hydraulic pump P circulates through hydraulic motors M1, M2 and M3. The drive-mode setting valve is closed so as to shut off ports 2a and 2b from ports 1a and 1b, and make a closed fluid circuit between hydraulic pump P and hydraulic motor M1 isolated from hydraulic motors M2 and M3, thereby putting the vehicle into a two-wheel drive mode where only hydraulic motor M1 is driven by fluid supplied from hydraulic pump P.

The casings of transaxles 1 and 2 are filled with fluid so as to form respective fluid sumps therein. The casing of rear transaxle 1 is provided with a drain port 1c from which a drainpipe 29 is connected to reservoir tank 28. The casing of front transaxle 2 is provided with a drain port 2c from which a drainpipe 30 is connected to reservoir tank 28. Therefore, reservoir tank 28 absorbs excessively expanded fluid in the respective fluid sumps of transaxles 1 and 2.

Rear transaxle 1 incorporates a charge pump 33 for supplying fluid to HST circuit HC1. As shown in FIG. 2, charge pump 33 is preferably driven together with hydraulic pump P by input shaft 17 serving as the pump shaft of hydraulic pump P. Charge pump 33 sucks fluid from the fluid sump in the casing of rear transaxle 1 through a suction line 31 (having an oil filter 32 at its start end). Alternatively, fluid to charge pump 33 may be introduced from reservoir tank 28 out of rear transaxle 1.

In the casing of rear transaxle 1, a charge fluid passage 34 is interposed between fluid passages 21 and 27 with hydraulic pump P therebetween, so as to charge fluid from charge pump 33 to hydraulically depressed one of fluid passages 21 and 27 via corresponding one of check valves 35. Charge fluid passage 34 is connected at a portion thereof between check valves 35 and 35 to a hydraulic pressure control valve 36, so as to drain excessive pressurized fluid via hydraulic pressure control valve 36 into the fluid sump in the casing of rear transaxle 1. Charge fluid passage 34 is also connected at the portion thereof between check valves 35 to suction line 31 via a check valve 39, in parallel to charge pump 33. Check valve 39 is opened when either fluid passage 21 or 27 is hydraulically depressed to open corresponding check valve 35 so as to absorb the suction port of charge pump 33 (suction line 31), thereby preventing cavitation in HST circuit HC1 during straight travel of the vehicle.

In the casing of rear transaxle 1, a differential gear unit 38 is disposed so as to differentially connect axles 6 to each other. Distal ends of axles 6 project oppositely laterally outward from the casing of rear transaxle 1 so as to be fixed to respective rear wheels 7 (alternatively, rear wheels 7 may be steerably connected to the distal ends of axles 6, as discussed later with reference to FIG. 23). In the casing of rear transaxle 1, a deceleration gear train 37 is interposed between a motor shaft M1a of hydraulic motor M1 and differential gear unit 38. In this way, rear transaxle 1 drives hydraulic motor M1 for driving both rear drive wheels 7 by pressurized fluid supplied from hydraulic pump P. Hydraulic pump P is provided with a movable swash plate Pa (see FIG. 2) linked with a speed change lever 14 (see FIG. 1) pivoted on the casing of rear transaxle 1. By depression of speed change pedal 13, movable swash plate Pa is set in direction and angle so as to set the fluid delivery direction and amount of hydraulic pump P, thereby setting the rotary direction and speed of rear wheels 7.

Description will now be given on peripheral speed setting of rear wheels 7 and front wheels 9 depending on the output rotary speed setting of hydraulic motor M1 and the pair of hydraulic motors M2 and M3, and design of HST circuit HC1 in correspondence to the peripheral speed setting of wheels 7 and 9. In a general manner, hydraulic motor M1 and hydraulic motors M2 and M3 would be set in output rotary speed so as to equalize peripheral speeds of rear wheels 7 to those of front wheels 9 during straight travel of the vehicle. However, if the setting is excessively strict, peripheral speed difference between rear wheels 7 and front wheels 9 due to road conditions causes stiff travel of the vehicle. That is, on one occasion, the peripheral speeds of rear wheels 7 exceed those of front wheels 9 (i.e., the peripheral speeds of front wheels 9 become lower than those corresponding to the set output of hydraulic motors M2 and M3), so as to cause a condition where front wheels 9 rotate following rotation of rear wheels 7. On another occasion, the peripheral speeds of front wheels 9 exceed those of rear wheels 7 (i.e., the peripheral speeds of rear wheels 7 become lower than those corresponding to the set output of hydraulic motor M1), so as to cause a condition where rear wheels 7 rotate following rotation of front wheels 9.

Therefore, the output rotary speeds of hydraulic motors M1, M2 and M3 are actually set so that, during straight travel of the vehicle, peripheral speeds of rear wheels 7 strictly exceed those of front wheels 9. Due to this setting, front wheels 9 almost constantly rotate following rotation of rear wheels 7. Even if the slowing-down degree of rear wheels 7 is considerably large (the peripheral speeds of rear wheels 7 is considerably reduced to be lower than those corresponding to the set output of hydraulic motor M1), peripheral speeds of rear wheels 7 is still larger than peripheral speeds of front wheels 9, or equal to peripheral speeds of front wheels 9. Even if the reduced peripheral speeds of rear wheels 7 become lower than the peripheral speeds of front wheels 9, the major case is that the peripheral speed difference between rear wheels 7 and front wheels 9 is still small so that rear wheels 7 are rotated with a little assistance of front wheels 9, and the difference of reduced peripheral speeds of rear wheels 7 from peripheral speeds of front wheels 9 hardly becomes sincerely large. Consequently, the vehicle is substantially prevented from stiffly traveling.

However, due to the output speed setting of hydraulic motors M1, M2 and M3 for making peripheral speeds of rear wheels 7 exceed peripheral speeds of front wheels 9, i.e., for rotating front wheels 9 following rotation of rear wheels 7, hydraulic motors M2 and M3 receive opposite torque from respective axles 8 so as to act as pumps. Consequently, primary (suction) ports of hydraulic motors M2 and M3 are hydraulically depressed. This phenomenon remarkably happens during turning of the vehicle, especially during sharp turning of the vehicle, thereby causing cavitation in the HST circuit, and causing hunting of the vehicle. Therefore, HST circuit HC1 includes a check valve disposed on the suction side fluid passage of the pair of hydraulic motors M2 and M3 so as to introduce fluid from the outside of HST circuit HC1 into HST circuit HC1. During forward travel of the vehicle, the suction side fluid passage comprises fluid passages 22 to 24a and 24b between hydraulic motor M1 and the pair of hydraulic motors M2 and M3. During backward travel of the vehicle, the suction side fluid passage comprises fluid passages 21 to 25a and 25b between hydraulic motor M1 and the pair of hydraulic motors M2 and M3 through hydraulic pump P. In the embodiment of FIG. 2, in front transaxle 2, a check valve 40 is connected to fluid passage 24a so as to introduce fluid from the fluid sump in the casing of front transaxle 2 to the suction side fluid passage of the pair of hydraulic motors M2 and M3 during forward travel of the vehicle. An oil filter 40a is interposed between check valve 40 and fluid passage 24a. On the other hand, in rear transaxle 1, the above-mentioned check valve 39 is provided for introducing fluid from the fluid sump in the casing of rear transaxle 1 to the suction side fluid passage of the pair of hydraulic motors M2 and M3 during backward travel of the vehicle.

Alternatively, check valve 40 to be opened during forward travel of the vehicle may be connected to fluid passage 24 or 24b in front transaxle 2. Alternatively, a check valve for absorbing fluid from the fluid sump in the casing of rear transaxle 1 may be connected to fluid passage 22 in rear transaxle 1 so as to have the same effect as check valve 40. On the other hand, in stead of check valve 39 in rear transaxle 1, a check valve may be connected to fluid passage 25, 25a or 25b in front transaxle 2 so as to introduce fluid from the fluid sump in the casing of front transaxle 2 to the suction side fluid passage of the pair of hydraulic motors M2 and M3 during backward travel of the vehicle.

In association with the peripheral speed setting such that peripheral speeds of rear wheels 7 exceed peripheral speeds of front wheels 9 during straight travel of the vehicle, fluid circulates in HST circuit HC 1 during forward travel of the vehicle so as to flow from hydraulic pump P to the pair of hydraulic motors M2 and M3 through hydraulic motor M1. Therefore, during forward climbing a slope, rear wheels 9 can be effectively rotated for smooth climbing of the vehicle over a slope, because hydraulic motor M1 for driving rear wheels 7 weighed more than front wheels 9 is effectively supplied with fluid from hydraulic pump P before the pair of hydraulic motors M2 and M3 is supplied.

However, during forward descending a slope, front wheels 9 weighed more than rear wheels 7 require larger driving force than that for rear wheels 7.

If the forward descending on a slope is more important than the forward ascending on a slope, the circulation route in HST circuit HC1 may be reversed so that, during forward travel of the vehicle, fluid from hydraulic pump P is supplied to hydraulic motor M1 through the pair of hydraulic motors M2 and M3.

Figure 3:
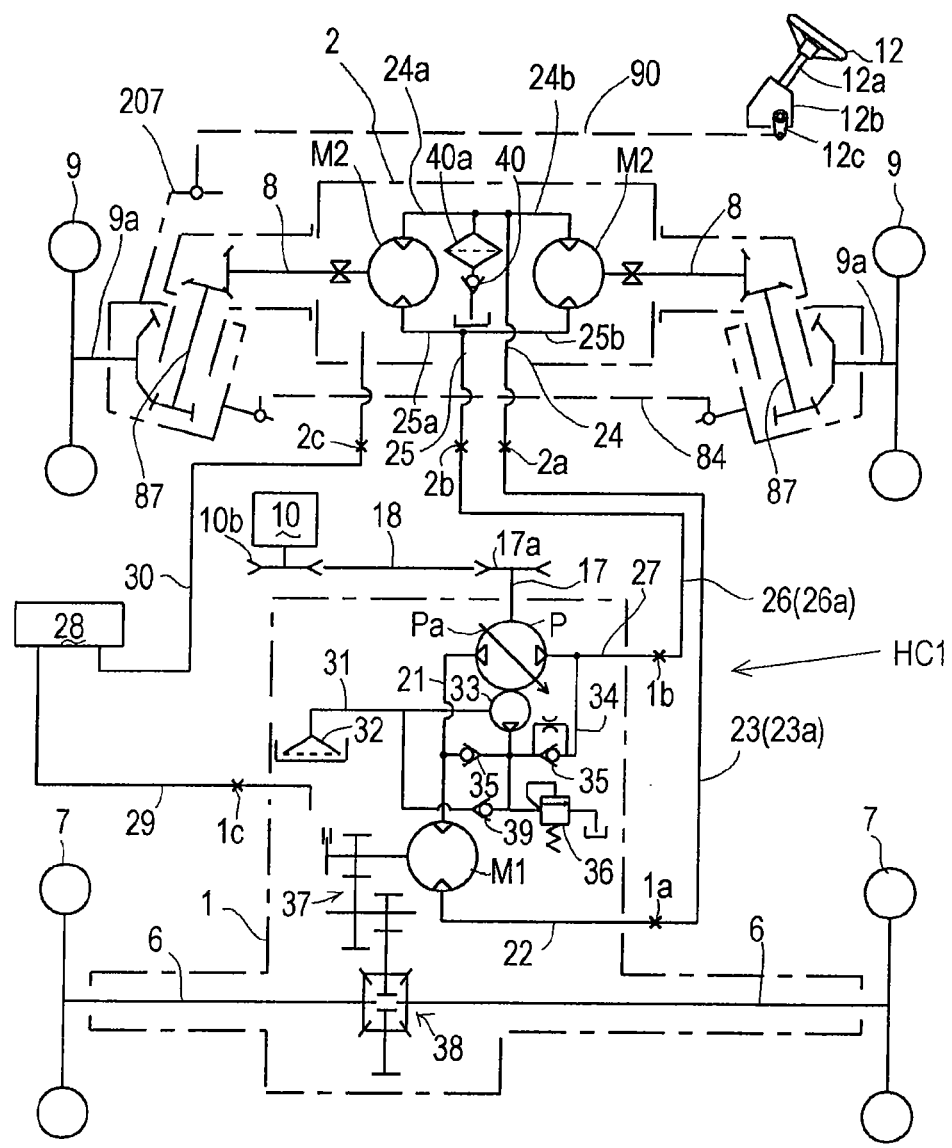
FIG. 3 is a skeleton diagram showing a hydraulic circuit and a structure for driving front and rear transaxles equipped on the vehicle of FIG. 1, wherein the front transaxle incorporates a pair of fixed displacement hydraulic motors.

Due to the above output setting of hydraulic motors M1, M2 and M3 and construction of HST circuit HC1, front wheels 9 receive driving forces from hydraulic motors M2 and M3 with the assistance of rotation of rear wheels 7. Therefore, the vehicle can travel straight without stiff movement, and the operation force required for steering front wheels 9 can be lightened so as to enable the vehicle to turn smoothly with the feeling of almost two-wheel drive mode travel. It may be said that acceleration of the forward wheels during turning of the vehicle is unnecessary. Due to this theory, as shown in FIG. 3, both of the hydraulic motors in front transaxle 2 for driving respective axles 8 may be fixed displacement hydraulic motors M2. In this case, fixed displacement hydraulic motors M2 of front transaxle 2 are fluidly connected to common hydraulic pump P in parallel to each other, and in series with hydraulic motor M1, so as to make peripheral speeds of rear wheels 7 slightly exceed or equal to peripheral speeds of front wheels 9 during straight travel of the vehicle. Check valve 40 is provided for introducing fluid from the fluid sump in front transaxle 2 to the suction side passage (in FIG. 3, fluid passage 24a) of the pair of hydraulic motors M2 in HST circuit HC1. Due to this construction, a later-discussed link mechanism for changing the displacement of the hydraulic motor is unnecessary.

Figure 4:
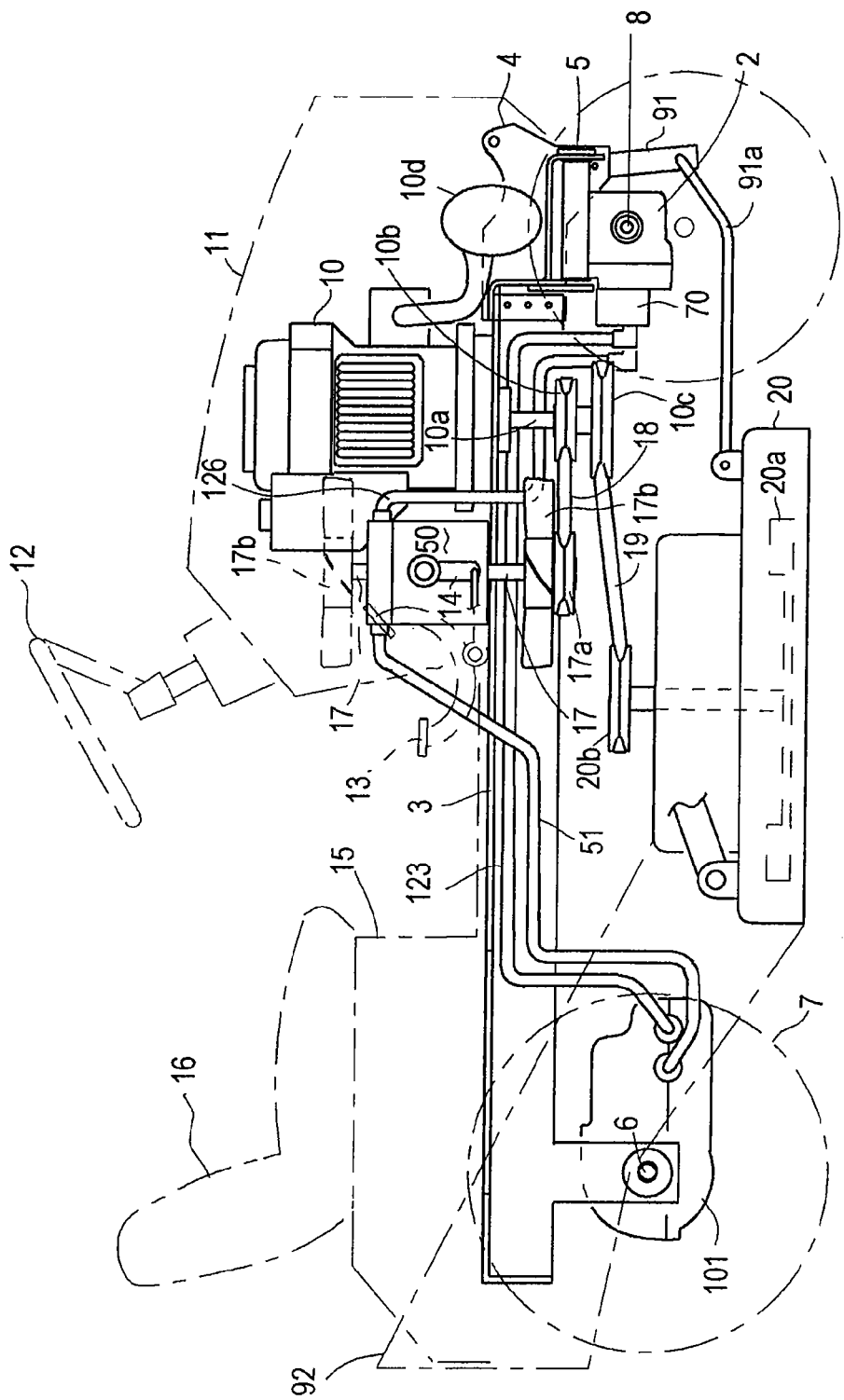
FIG. 4 is a side view of a four-wheel drive lawn tractor serving as a hydraulically driven vehicle according to a second embodiment of the present invention.
Figure 5:
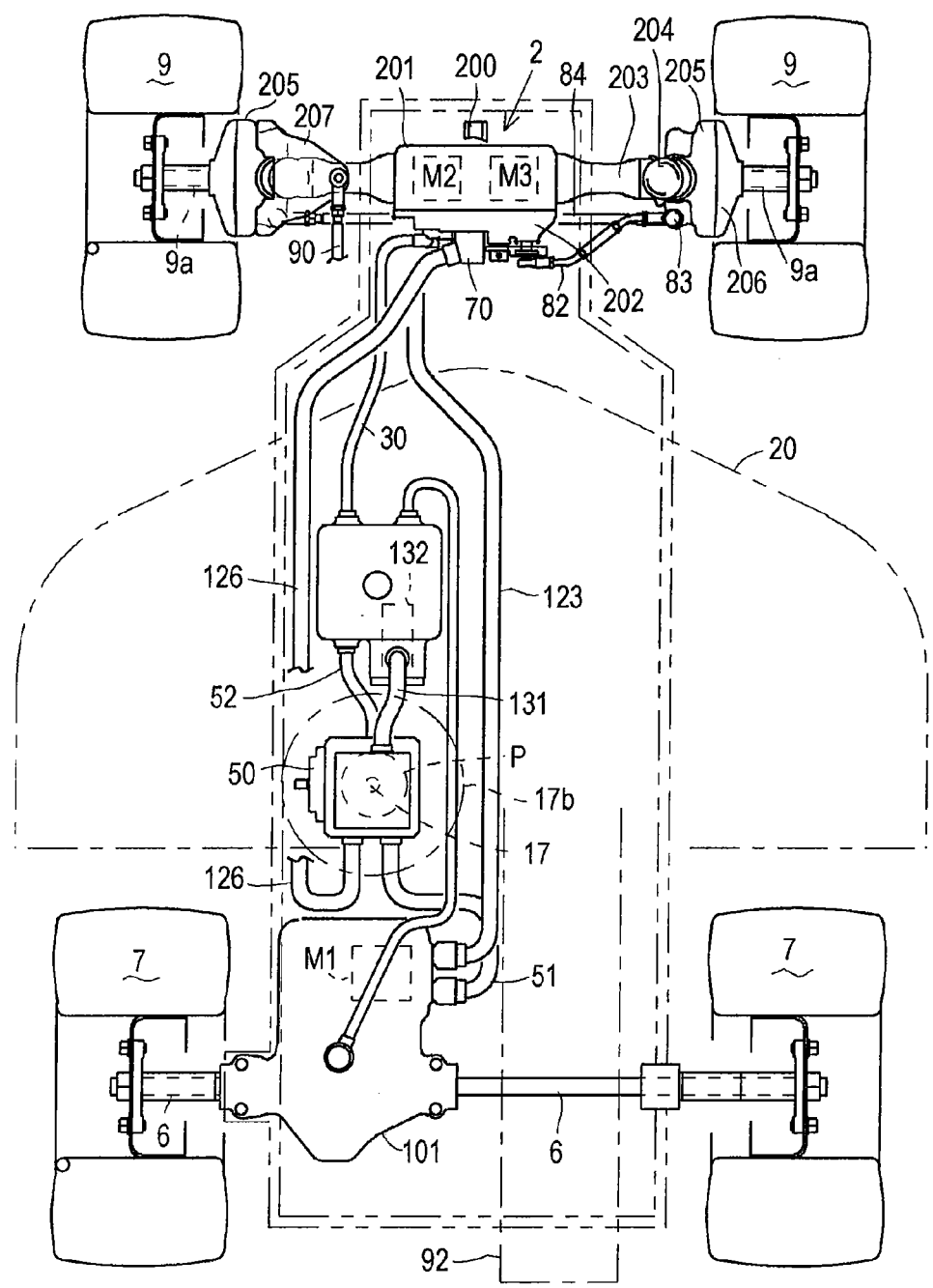
FIG. 5 is a plan view of the vehicle of FIG. 4.
Figure 6:
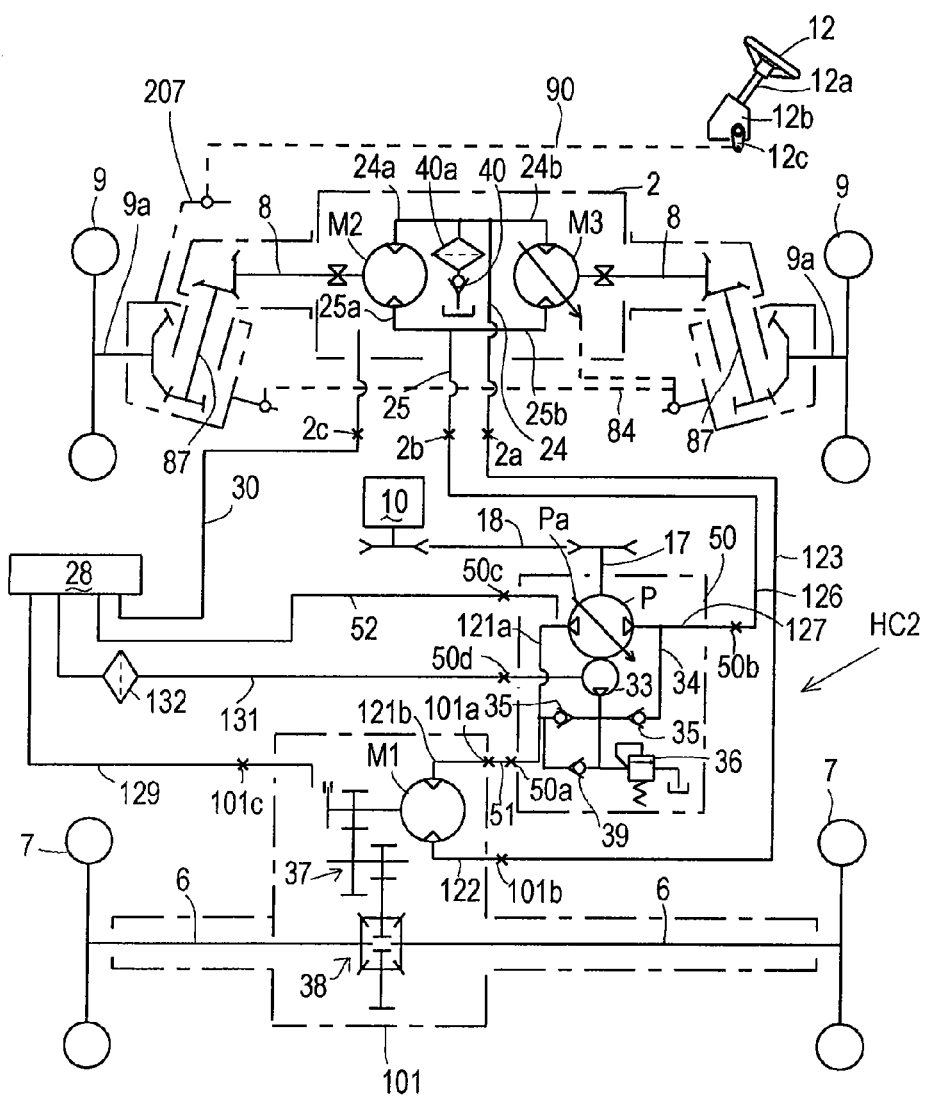
FIG. 6 is a skeleton diagram showing a hydraulic circuit and a structure for driving front and rear transaxles of the vehicle of FIGS. 4 and 5.

Referring to FIGS. 4, 5 and 6, an Ackerman-type steering lawn tractor serving as a four-wheel drive vehicle equipped with a hydraulic transaxle according to a second embodiment of the present invention will be described. The lawn tractor has vehicle frame 3 supporting a rear transaxle 101 at a rear portion thereof, and front transaxle 2 at a front portion thereof. A pump unit 50 and reservoir tank 28 are laterally juxtaposed and supported by vehicle frame 3 just in front of rear transaxle 101. Preferably, similar to the vehicle of FIG. 1, the present vehicle includes bracket 4 fixed on a front end portion of vehicle frame 3, and fore-and-aft horizontal center pin 5 pivoted on bracket 4 for rotatably suspending front transaxle 2 therefrom. Rear transaxle 101 supports left and right axles 6 whose outer ends are fixed to the center portions of respective rear wheels 7 (alternatively, steerably connected to respective rear wheels 7, as discussed later). Front transaxle 2 supports left and right axles 8 to which respective front wheels 9 (serving as steerable second drive wheels) are vertically swingably and drivingly connected.

Engine 10 is vibro-isolatingly supported on vehicle frame 3 via vibro-isolating rubbers or the like. Pulley 10b is fixed on output shaft 10a of engine 10. Input shaft 17 serves as the pump shaft of hydraulic pump P in the casing of pump unit 50. Input shaft 17 projects upward from a casing of pump unit 50 so as to be fixedly provided thereon with pulley 17a. Belt 18 is interposed between pulleys 10b and 17a so as to drivingly connect hydraulic pump P to engine 10. Cooling fan 17b is fixed on input shaft 17 above the casing of pump unit 50 so as to blow cooling air to the casing of pump unit 50 and reservoir tank 28 adjacent to the casing of pump unit 50. Pipes 51, 123 and 126, constituting a later-discussed HST circuit HC2, and drainpipes 52, 129 and 30 connected to reservoir tank 28 are partly disposed in an area blown by cooling wind generated from cooling fan 17b so as to enhance the effect of cooling fluid therein.

Pump unit 50 also obtains the vibro-isolating effect of engine 10 against vehicle frame 3. More specifically, pump unit 50 is vibro-isolatingly supported together with engine 10 onto vehicle frame 3. To get such vibro-isolating effect, engine output shaft 10a may be coaxially and integrally rotatably connected to input shaft 17, or single engine output shaft 10a may be extended so as to serve as input shaft 17 of pump unit 50.

Variable displacement hydraulic pump P in pump unit 50 is provided with movable swash plate Pa linked to speed change lever 14 pivoted on the casing of pump unit 50, and speed change lever 14 is linked to speed change pedal 13. By depression of speed change pedal 13, movable swash plate Pa is set in direction and angle so as to set the fluid delivery direction and amount of hydraulic pump P.

Mower 20 is disposed below vehicle frame 3 between front wheels 9 and rear wheels 7. Rotary blade 20a in mower 20 is drivingly connected to engine 10 via power transmission means, e.g., a belt transmission, such as the belt transmission of the vehicle shown in FIG. 1 including pulleys 10c and 20b and belt 19.

A duct 92 is extended rearward from mower 20 so as to send grass mowed by rotary blade 20a. Rear transaxle 101 having no hydraulic pump is vertically and laterally slimed. Such rear transaxle 101 is laterally eccentrically disposed toward one of left and right sides of the vehicle (in this embodiment, leftward) so as to ensure a large space for duct 92 on the other right or left side of the vehicle (in this embodiment, right side). Therefore, duct 92 can have such a large capacity as to prevent wet grass from clogging therein.

Further, as shown in FIG. 5, pump unit 50 and reservoir tank 28 are aligned in the fore-and-aft direction on one of left and right sides of the vehicle along one side surface of duct 92, so as to increase the capacity of duct 92, and to compactly collect fluid pipes including pipe 126.

Cooling fan 17b fixed on a bottom end of input shaft 17 of pump unit 50 blows upward cooling wind to adjoining pump unit 50 and reservoir tank 28 and fluid pipes so as to cool fluid therein. Additionally, as drawn in phantom lines, input shaft 17 may be extended upward from pump unit 50 so as to be provided thereon with another cooling fan 17b for blowing downward cooling wind. In this case, vehicle frame 3 is opened to lead the downward cooling wind to pipes.

Hydraulic motor M1 for driving rear wheels 7 (axles 6) are disposed in the casing of rear transaxle 101. On the other hand, a pair of hydraulic motors M2 and M3 for driving respective left and right front wheels 9 (axles 8) are disposed in the casing of front transaxle 2. An HST fluid pipe 51 is interposed between pump unit 50 and rear transaxle 101, an HST fluid pipe 123 between rear transaxle 101 and front transaxle 2, and an HST fluid pipe 126 between front transaxle 2 and pump unit 50, thereby constituting HST circuit HC2. Pipes 123 and 126 may be provided at intermediate portions thereof with flexible hoses, respectively, similar to fluid pipes 23 and 26 including flexible hoses 23a and 26a in the vehicle according to the first embodiment as shown in FIG. 1.

HST circuit HC2 will be described with reference to FIG. 6. The casing of pump unit 50 has outwardly opened HST fluid ports 50a and 50b, the casing of rear transaxle 101 has outwardly opened HST fluid ports 101a and 101b, and the casing of front transaxle 2 has outwardly opened HST fluid ports 2a and 2b. Pipe 51 is interposed between ports 50a and 101a, pipe 123 is interposed between ports 101b and 2a, and pipe 126 is interposed between ports 2b and 50b.

In the casing of pump unit 50 incorporates common hydraulic pump P for supplying fluid to hydraulic motors M1, M2 and M3. In the casing of pump unit 50, a fluid passage 121a is extended from hydraulic pump P to port 50a, and a fluid passage 127 from hydraulic pump P to port 50b. In the casing of rear transaxle 101, a fluid passage 121b is extended from hydraulic motor M1 to port 101a, and a fluid passage 122 from hydraulic motor M1 to port 10b. Fluid passages 121a and 121b and pipe 51 constitute a fluid passage 121 between hydraulic pump P and hydraulic motor M1.

Similar to front transaxle 2 of the vehicle shown in FIG. 1, in the casing of the present front transaxle 2, fixed displacement hydraulic motor M2 for driving one front wheel 9 and variable displacement hydraulic motor M3 for driving the other front wheel 9 are disposed, fluid passages 24, 24a and 24b are interposed between port 2a and the pair of hydraulic motors M2 and M3, and fluid passages 25, 25a and 25b between port 2b and the pair of hydraulic motors M2 and M3.

In HST circuit HC2, hydraulic motor M1 of rear transaxle 101 and the pair of hydraulic motors M2 and M3 of front transaxle 2 are connected in series to hydraulic pump P. Hydraulic motors M2 and M3 in front transaxle 2 are fluidly connected to hydraulic pump P in parallel to each other.

In HST circuit HC1, during forward traveling of the vehicle, fluid delivered from hydraulic pump P flows through fluid passage 121 (i.e., fluid passage 121a, pipe 51 and fluid passage 121b), hydraulic motor M1, hydraulic passage 122, outwardly opened port 101b, pipe 123, outwardly opened port 2a, fluid passage 24, the pair of hydraulic motors M2 and M3, fluid passage 25, outwardly opened port 2b, pipe 126, outwardly opened port 50b, and fluid passage 127, so as to return to hydraulic pump P. In other words, during forward travel of the vehicle, pressurized fluid from hydraulic pump P is supplied to hydraulic motor M1 of rear transaxle 1 before the pair of hydraulic motors M2 and M3 of front transaxle 2. During backward travel of the vehicle, the fluid circulation route in HST circuit HC2 is reversed, that is, pressurized fluid from hydraulic pump P is supplied to the pair of hydraulic motors M2 and M3 of front transaxle 2 before hydraulic motor M1 of rear transaxle 1.

Such circulation route of HST circuit HC2 is set for the same reason as the circulation route setting of HST circuit HC1 of the vehicle shown in FIGS. 1 and 2 (and FIG. 3).

Additionally, a drive-mode setting valve for switching drive mode of the vehicle between four-wheel drive mode and two-wheel drive mode may be interposed between hydraulic motor M1 and the pair of hydraulic motors M2 and M3 in HST circuit HC2.

The casings of pump unit 50 and transaxles 1 and 2 are filled with fluid so as to form respective fluid sumps therein. As shown in FIG. 6, the casing of pump unit 50 is provided with a drain port 50c from which a drainpipe 52 is connected to reservoir tank 28. The casing of rear transaxle 101 is provided with a drain port 101c from which a drainpipe 129 is connected to reservoir tank 28. The casing of front transaxle 2 is provided with drain port 2c from which drainpipe 30 is connected to reservoir tank 28. Therefore, reservoir tank 28 absorbs excessively expanded fluid in the respective fluid sumps of pump unit 50 and transaxles 101 and 2.

Pump unit 50 incorporates charge pump 33 for supplying fluid to HST circuit HC2. As shown in FIG. 6, charge pump 33 is preferably driven together with hydraulic pump P by input shaft 17 serving as the pump shaft of hydraulic pump P. Pump unit 50 is provided with a charge pump port 50d. A charge pipe 131 including an intermediate oil filter 132 is interposed between reservoir tank 28 and charge pump port 50d, so as to introduce fluid from reservoir tank 28 to charge pump 33.

In the casing of pump unit 50, charge fluid passage 34 is interposed between fluid passages 121a and 127 with hydraulic pump P therebetween, so as to charge fluid from charge pump 33 to hydraulically depressed one of fluid passages 121 and 127 via corresponding one of check valves 35. Charge fluid passage 34 is connected at a portion thereof between check valves 35 and 35 to hydraulic pressure control valve 36, so as to drain excessive pressurized fluid via hydraulic pressure control valve 36 into the fluid sump in the casing of pump unit 50. Check valve 39 for preventing cavitation is interposed between charge fluid passage 34 and hydraulic pressure control valve 36 so as to bypass one of check valves 35.

Similar to rear transaxle 1 of the vehicle shown in FIGS. 1 and 2, rear transaxle 101 incorporates differential gear unit 38 for mutually differentially connecting axles 6, and deceleration gear train 37 interposed between motor shaft M1a of hydraulic motor M1 and differential gear unit 38.

As the vehicle shown in FIGS. 1 and 2, the present vehicle shown in FIGS. 4, 5 and 6 has the same relative peripheral speed setting of rear wheels 7 and front wheels 9, and the same output rotary speed of hydraulic motor M1, M2 and M3 for ensuring the relative peripheral speed setting of rear wheels 7 and front wheels 9. Further, similar to HST circuit HC1, HST circuit HC2 is provided with check valves for compensation of fluid reduced by the output rotary speed setting of hydraulic motors M1, M2 and M3. More specifically, peripheral speeds of rear wheels 7 exceed or are equal to peripheral speeds of front wheels 9 during straight travel of the vehicle. A check valve for introducing fluid into HST circuit HC2, e.g., check valve 40 in front transaxle 2 as shown in FIG. 6, is connected to the suction side fluid passage of the pair of hydraulic motors M2 and M3. Alternatively, the vehicle of FIGS. 4, 5 and 6 with HST circuit HC2 may be provided with fixed displacement hydraulic motors M2 serving as the pair of hydraulic motors in front transaxle 2, similar to that shown in FIG. 3.

Figure 7:
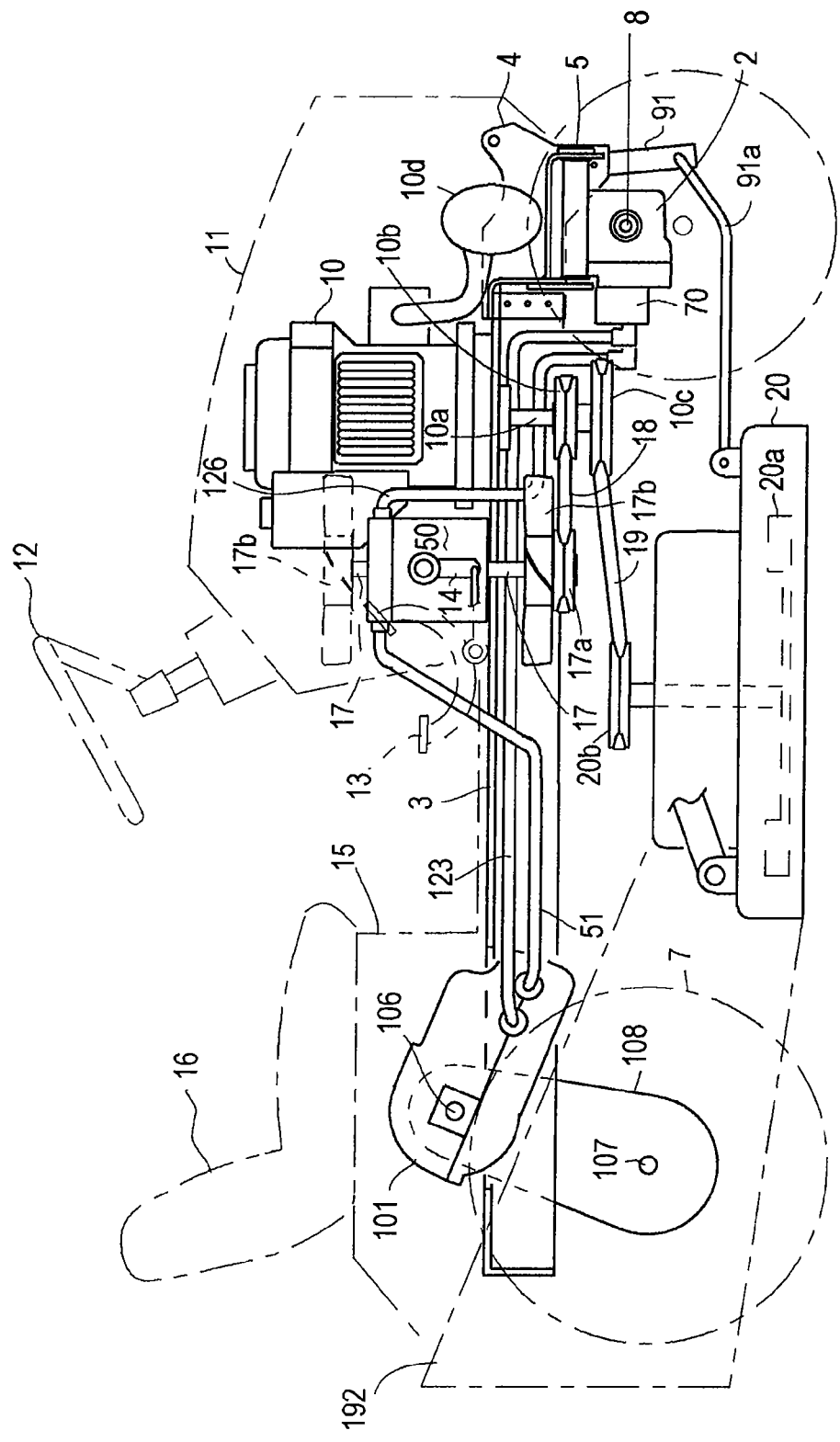
FIG. 7 is a side view of a four-wheel drive lawn tractor serving as a hydraulically driven vehicle according to a third embodiment of the present invention.
Figure 8:
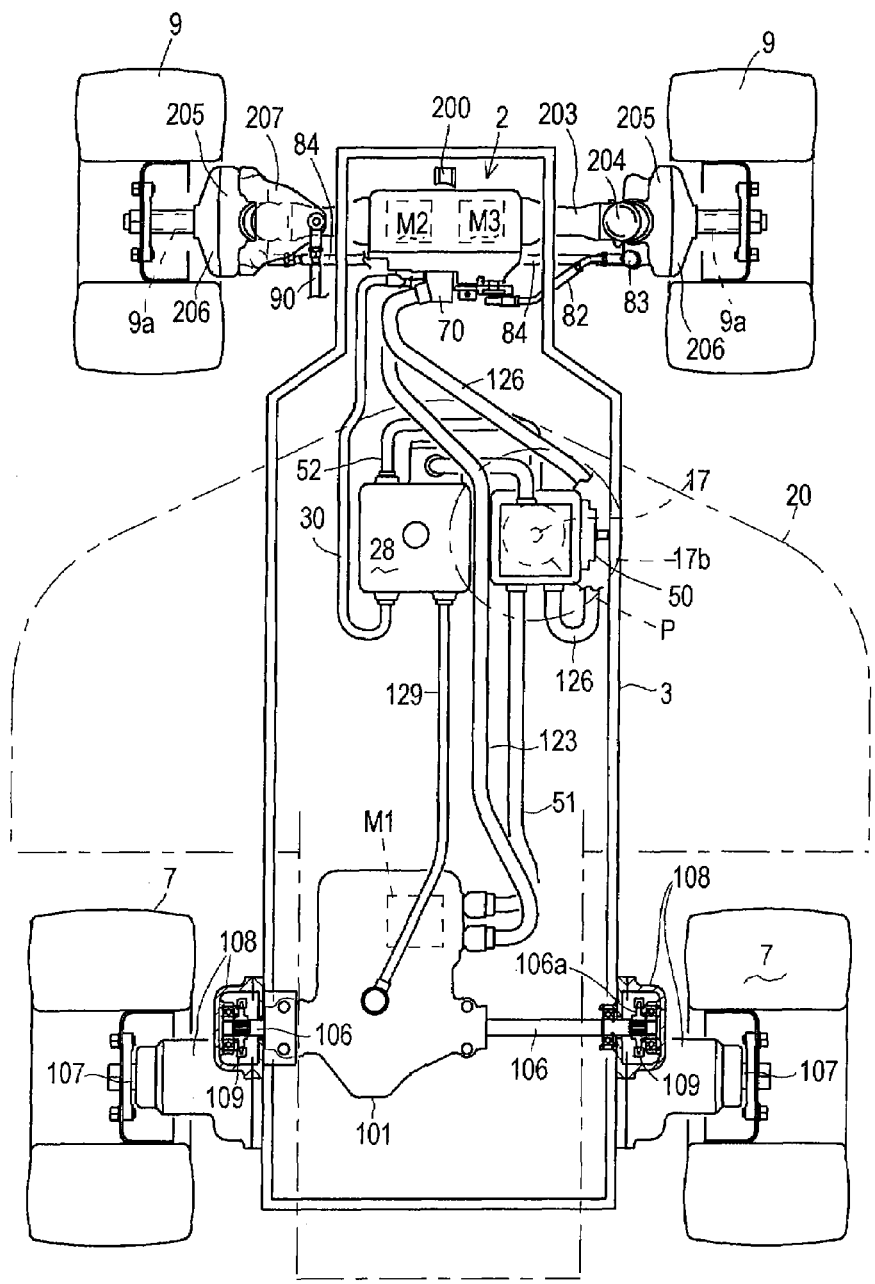
FIG. 8 is a plan view of the vehicle of FIG. 7.
Figure 9:
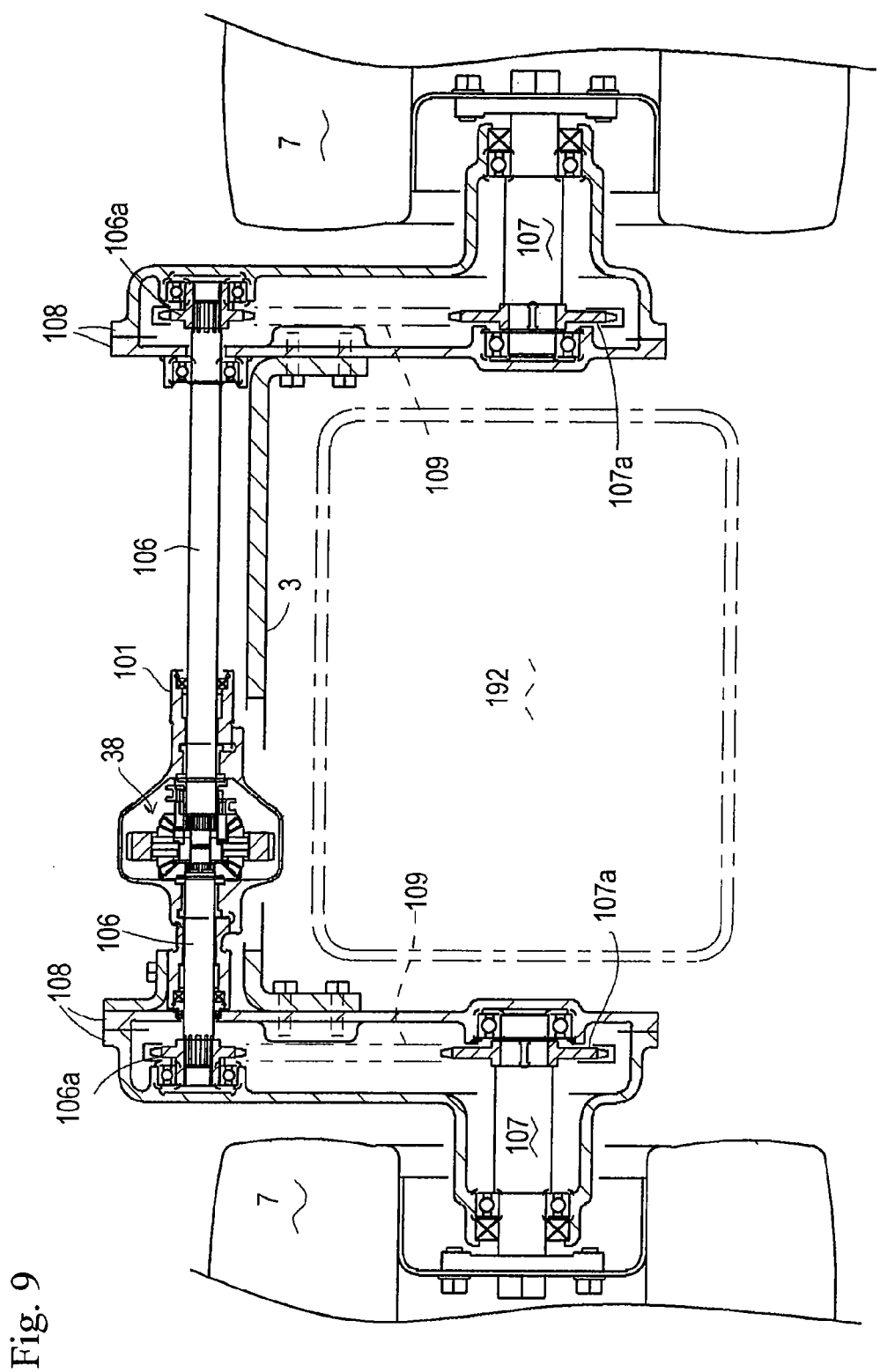
FIG. 9 is a sectional rear view of the vehicle of FIGS. 7 and 8.

Referring to FIGS. 7, 8 and 9, an Ackerman-type steering lawn tractor serving as a four-wheel drive vehicle equipped with a hydraulic transaxle according to a third embodiment of the present invention will be described. In the present lawn tractor, pump unit 50 incorporating hydraulic pump P is separated from rear transaxle 101 incorporating hydraulic motor M1, similar to those in the lawn tractor of the second embodiment. The different point of the present vehicle from the vehicle of the second embodiment is that a duct 192 is extended rearward from mower 20 at the lateral center of the vehicle.

Separated pump unit 50 and rear transaxle 101 are so compact as to be distributed on vehicle frame 3 while ensuring sufficient capacity in duct 192. In the present embodiment, pump unit 50 and reservoir tank 28 are laterally juxtaposed on vehicle frame 3 just in front of duct 192, and rear transaxle 101 is supported on vehicle frame 3 just above a fore-and-aft intermediate portion of duct 192. Cooling fan 17b fixed on a bottom end of input shaft 17 of pump unit 50 blows upward cooling wind to adjoining pump unit 50 and reservoir tank 28 and fluid pipes so as to cool fluid therein. Additionally, as drawn in phantom lines, input shaft 17 may be extended upward from pump unit 50 so as to be provided thereon with another cooling fan 17b for blowing downward cooling wind. In this case, vehicle frame 3 is opened to lead the downward cooling wind to pipes. Rear transaxle 101 may be disposed on vehicle frame 3 in front or rear of pump unit 50. Especially, as shown in FIG. 7, rear transaxle 101 may be disposed so as to have a bottom surface thereof sloped along a sloped upper surface of duct 192, thereby approaching pump unit 50 and reducing a dead space. This is appropriate for a small size vehicle. Another effect of rear transaxle 101 disposed at such a high position on vehicle frame 3 is that a space in rear cover 15 can be used for locating a portion of rear transaxle 101 projecting upward from vehicle frame 3.

Rear transaxle 101 has left and right rear-wheel-driving output shafts 106 which are differentially connected to each other by differential gear unit 38 and extended oppositely outward from the casing of rear transaxle 1. As shown in FIGS. 8 and 9, left and right chain casings 108 are disposed at left and right outsides of duct 192. Outer ends of output shafts 106 are inserted into upper portions of respective chain casings 108, and sprockets 106a are fixed on the outer ends of respective output shafts 106 in respective chain casings 108. When viewed in front or rear, left and right output shafts 106 and chain casings 108 look like a gate.

Left and right rear wheels 7 has respective axles 107 extended laterally proximally of the vehicle. Axles 107 are inserted into lower portions of respective chain casings 108, and sprockets 107a are fixed on the proximal ends of respective axles 107 in respective chain casings 108. In each of chain casings 108, a chain 109 is interposed between sprockets 106a and 107a so as to transmit the driving force of output shaft 106 to axle 107, thereby driving left and right rear wheels 7.

A drive system of the present vehicle is represented by the description of drive system of the vehicle according to the second embodiment with reference to FIG. 6, except that the chain transmissions are interposed between differential gear unit 38 and respective rear wheels 7. Alternatively, both the hydraulic motors in front transaxle 2 may be fixed displacement hydraulic motors M2.

Front transaxle 2 incorporating fixed displacement hydraulic motor M2 and variable displacement hydraulic motor M3 will be described with reference to FIGS. 1, 2 and 4 to 20.

Figure 10:
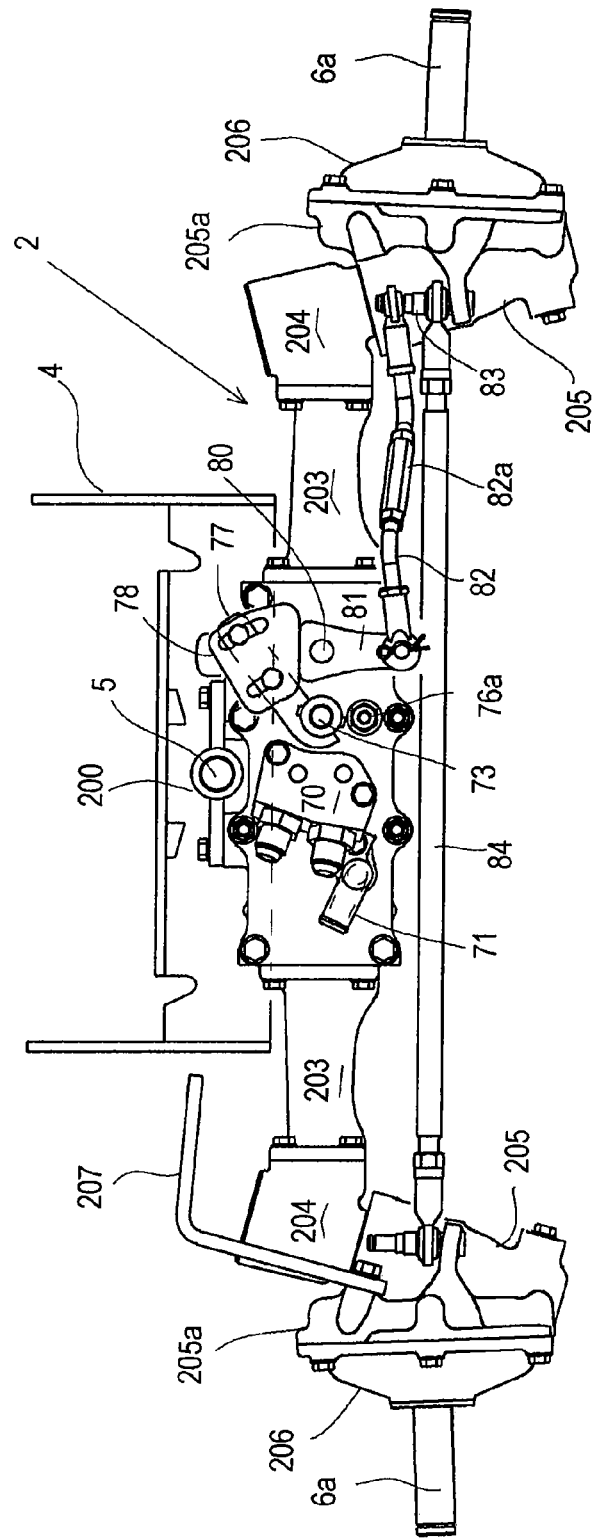
FIG. 10 is a front view of the front transaxle for the vehicles according to the first to third embodiments, wherein the front transaxle incorporates the combination of the variable displacement hydraulic motor and the fixed displacement hydraulic motor.
Figure 11:
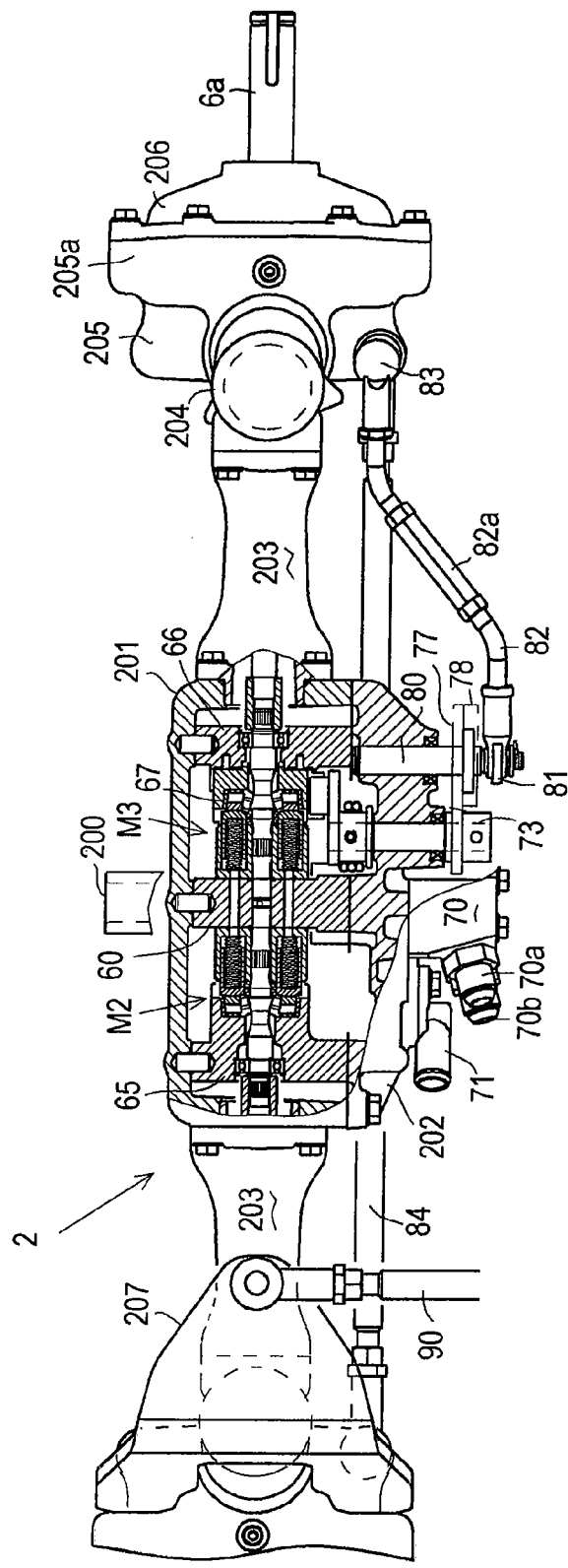
FIG. 11 is a plan view of the front transaxle.
Figure 12:
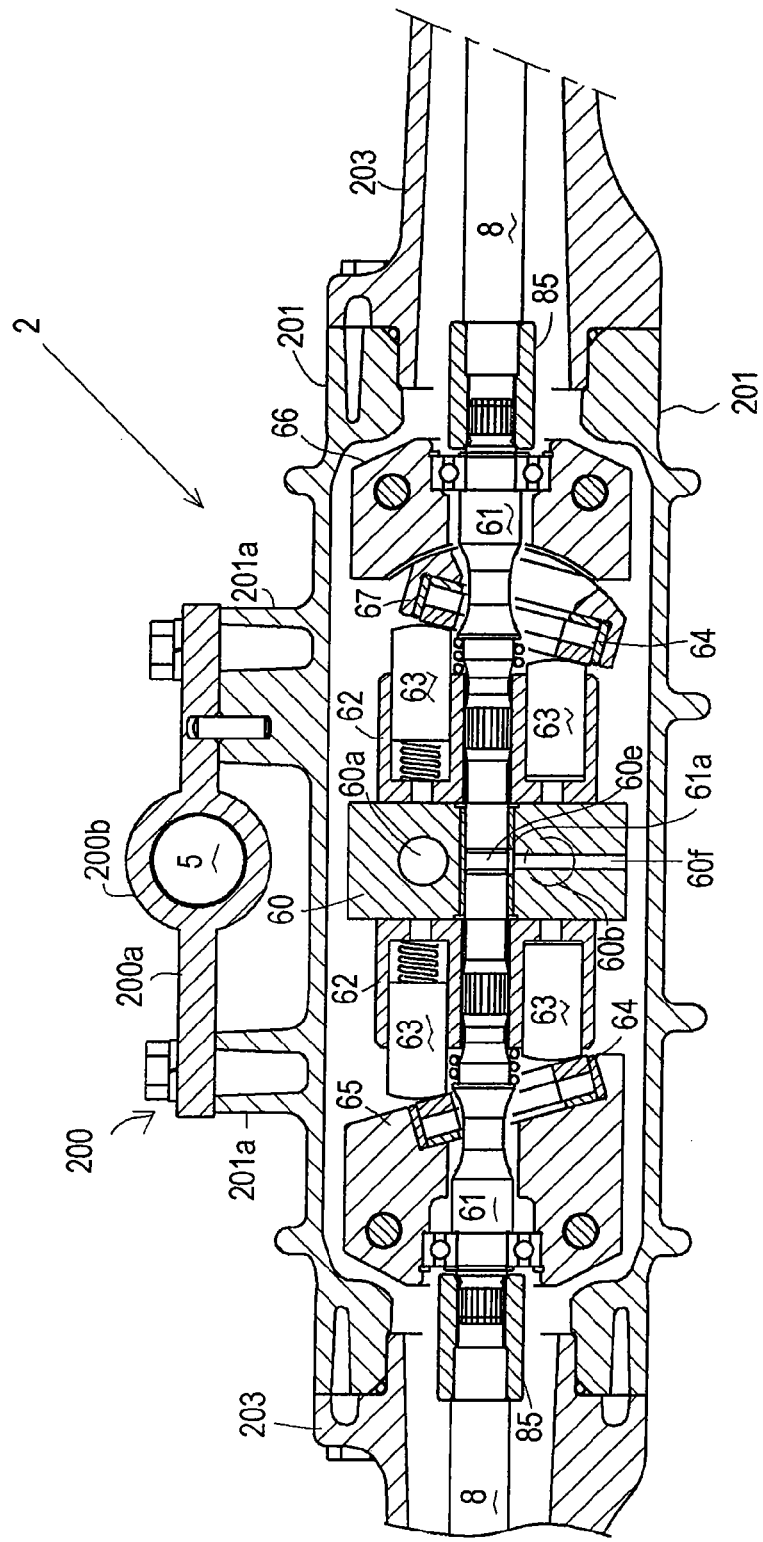
FIG. 12 is an enlarged sectional front view of a portion of the front transaxle incorporating a motor assembly and axles.

Referring to a casing structure of front transaxle 2, as shown in FIGS. 10 to 12, a motor casing 201 is disposed between left and right axle casings 203, and detachably attached to each axle casing 203. Axle casings 203 incorporate respective axles 8. A spacer may be interposed between motor casing 201 and any of axle casings 203, if a tread between front wheels 9 has to be lengthened. Kingpin casings 204 are fixed on distal ends of respective axle casings 203, extended laterally outwardly downward at kingpin angles, and inserted into respective steerable casings 205. Steerable casings 205 are rotatable centered on the axes of respective kingpin casings 204.

Figure 15:
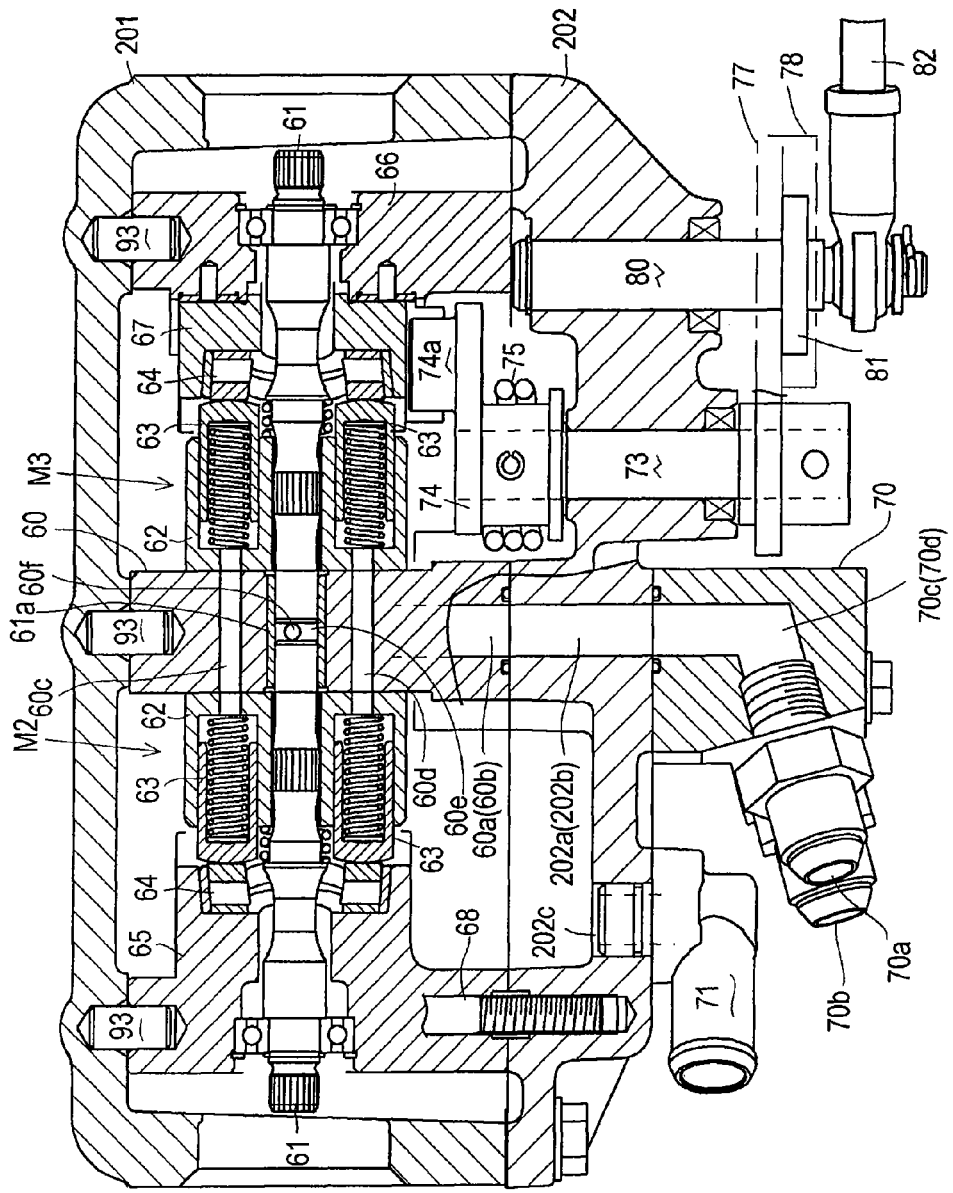
FIG. 15 is a sectional plan view of the motor casing.
Figure 17:
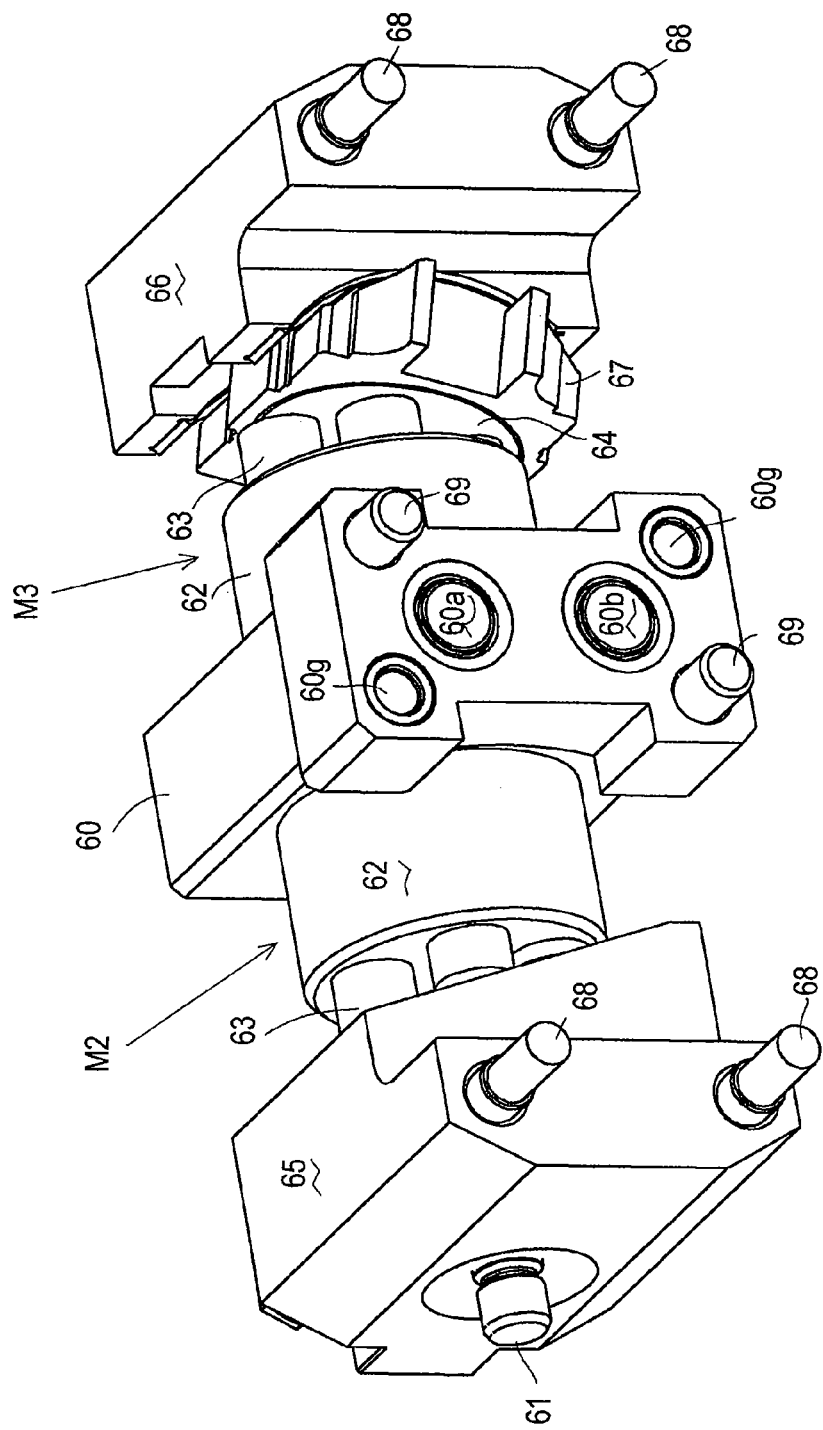
FIG. 17 is a rearwardly perspective view of the motor assembly to be disposed in the motor casing.

As shown in FIGS. 11 and 15, motor casing 201 is opened at a rear end thereof. A motor cover 202, onto which a assembly of hydraulic motors M2 and M3 (motor assembly) are attached as shown in FIG. 17, is fitted to the rear end of motor casing 201 so as to cover the rear opening of motor casing 201, thereby setting hydraulic motors M2 and M3 in motor casing 201. Motor casing 201 can be removed from motor casing 202 so as to easily take out the assembly of hydraulic motors M2 and M3 from motor casing 201, thereby facilitating maintenance of hydraulic motors M2 and M3.

Figure 14:
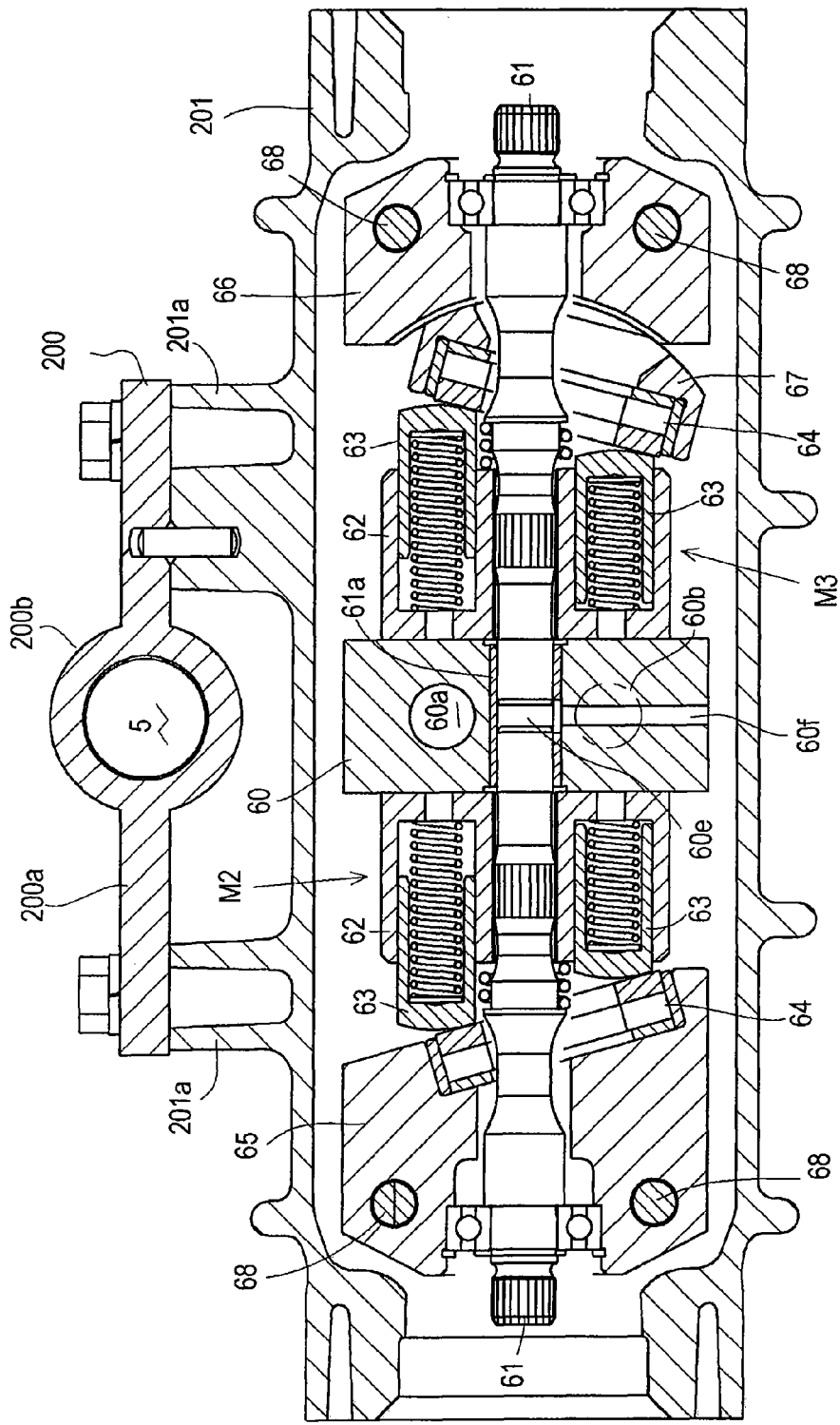
FIG. 14 is a sectional front view of a motor casing fitted into the front transaxle.

The motor assembly will be described with reference to FIGS. 14, 15, 17 and others. Each of hydraulic motors M2 and M3 comprises: a horizontal motor shaft 61 to be drivingly connected to corresponding axle 8; a cylinder block 62 which is rotatable together with motor shaft 61 centered on the axis of motor shaft 61; and horizontal pistons 63 reciprocally slidably fitted in respective cylinder holes of cylinder block 62 around motor shaft 61. Cylinder blocks 62 of hydraulic motors M2 and M3 are slidably rotatably fitted onto a center section 60 disposed between cylinder blocks 62.

Figure 20:
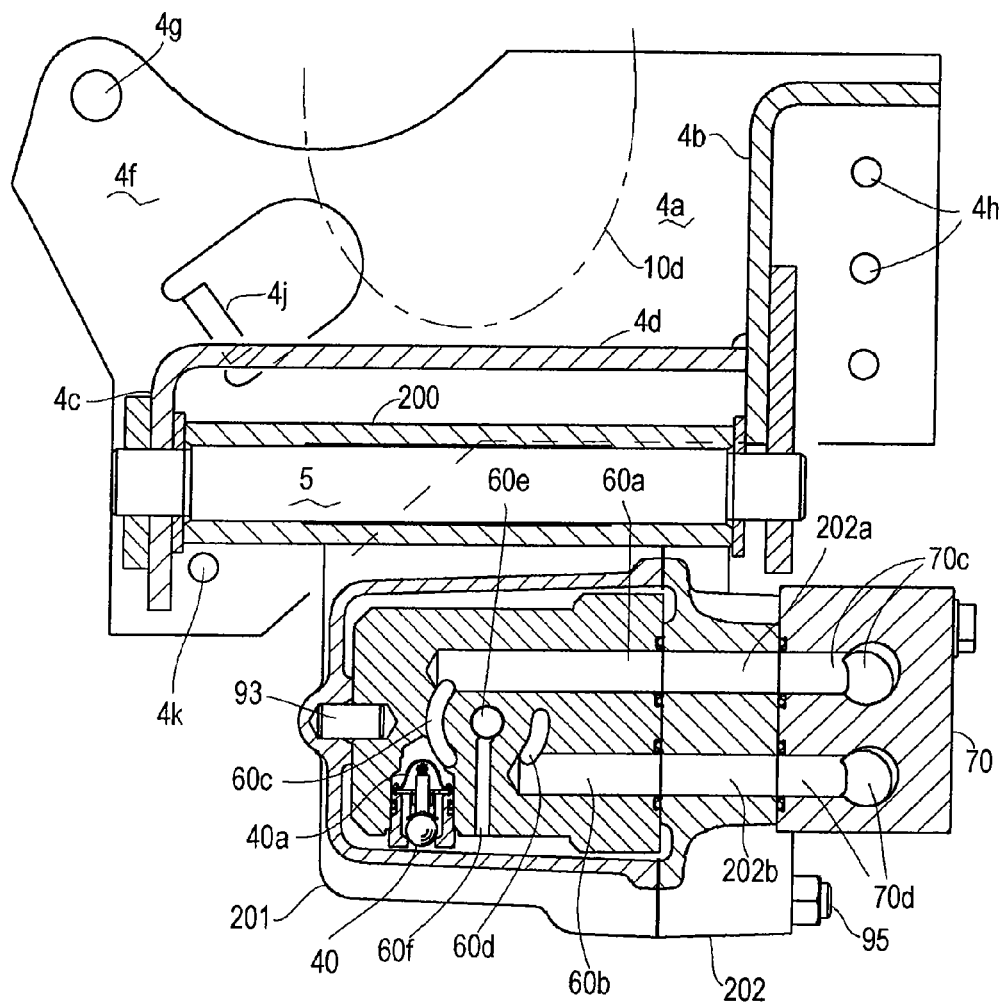
FIG. 20 is a sectional side view of the motor casing, the motor cover and a pipe connector block, showing hydraulic passages for driving the hydraulic motor therein.

As best shown in FIGS. 12, 17 and 20, a pair of parallel fluid passages 60a and 60b are bored in center section 60 so as to be extended in the fore-and-aft direction and opened rearward. Fluid passages 60a and 60b serve as respective fluid passages 24 and 25 in each of HST circuit HC1 shown in FIG. 2 and HST circuit HC2 shown in FIG. 6. As best shown in FIGS. 15 and 20, a pair of kidney ports 60c and 60d laterally penetrate center section 60 so as to be opened at left and right ends thereof to the cylinder holes of respective cylinder blocks 62. Fluid passage 60a is connected to kidney port 60c, and fluid passage 60b to kidney port 60d. Therefore, kidney port 60c serves as bifurcating fluid passages 24a and 24b, and kidney port 60d serves as bifurcating fluid passages 25a and 25b. Center section 60 is penetrated between kidney ports 60c and 60d by a laterally horizontal shaft hole 60e, into which proximal end portions of motor shafts 61 are slidably rotatably fitted. Further, a fluid drain passage 60f is bored in center section 60. Fluid drain passage 60f is opened at one end thereof to a portion of shaft hole 60e between the proximal ends of motor shafts 61, and be opened at the other end thereof outward from center section 60 to the fluid sump in motor casing 201, thereby fluidly connecting shaft hole 60e to the fluid sump in motor casing 201. As shown in FIG. 14, in shaft hole 60e, a bush 61a (or a needle bearing) is interposed between center section 60 and motor shafts 61 so as to reduce frictional resistance to motor shafts 61, thereby improving mechanical efficiency of rotation of motor shafts 61.

As shown in FIGS. 12, 14, 15 and 17, each of hydraulic motors M2 and M3 has a thrust bearing 64 pressed against heads of pistons 63. Thrust bearing 64 of fixed displacement hydraulic motor M2 is positionally fixed in a fixed swash plate support 65, thereby serving as a fixed swash plate (hereinafter referred to as "fixed swash plate 64"). Some fixed swash plate supports 65 having different slant angles may be prepared for optional setting of slant angle fixed swash plate 64 of hydraulic motor M2. Variable displacement hydraulic motor M3 has a movable swash plate 67, which is rotatably supported by a movable swash plate support 66 so that its tilt angle relative to movable swash plate support 66 can be changed. Thrust bearing 64 of hydraulic motor M3 is integrally assembled in movable swash plate 67.

To fix the motor assembly to an inside (front) surface of motor cover 202, as best shown in FIG. 17, bolts 68 project rearward from rear end surfaces of respective swash plate supports 65 and 66. A bolt hole 60g is bored in center section 60 and opened at the rear end surface of center section 60. Swash plate supports 65 and 66 are fastened to motor cover 202 by bolts 68, and center section 60 is fastened to motor cover 202 by a bolt 96 (see FIG. 18) screwed into bolt hole 60g. Additionally, a knock pin 69 for locating motor cover 202 projects rearward from the rear end surface of center section 60.

As best shown in FIG. 15, rearwardly opened front joggle holes are bored in a front wall of motor casing 201. Forwardly opened rear joggle holes are bored in center section 60 and swash plate supports 65 and 66, respectively. When the motor assembly is inserted into motor casing 201, the rear joggle holes of center section 60 and swash plate supports 65 and 66 coincide to the respective front joggle holes of motor casing 201 with respective joggles 93 fitted between the coinciding front and rear joggle holes, thereby retaining center section 60 and swash plate supports 65 and 66 to motor casing 201 onto the front wall of motor casing 201. In this state, motor cover 202 is fitted to motor casing 201 so as to cover the rear opening of motor casing 201. Then, bolts 95 are screwed forward together with motor cover 202 into motor casing 201, thereby completing setting of the motor assembly.

Motor cover 202 with the motor assembly in motor casing 201 is fixedly provided with a pipe coupling block 70 on the rear surface thereof just in rear of center section 60. Pipe coupling block 70 is bored by fluid passages 70c and 70d, which are opened to respective fluid passages 60a and 60b via respective fluid passages 202a and 202b penetrating motor cover 202. Pipe couplings 70a and 70b are disposed at outer ends of respective fluid passages 70c and 70d, and project outward from pipe coupling block 70. Pipe couplings 70a and 70b serve as fluid ports 2a and 2b of each of HST circuits HC1 and HC2 shown in FIGS. 2 and 6. The series of fluid passages 70c, 202a and 60a serves as fluid passage 24. The series of fluid passages 70d, 202b and 60b serves as fluid passage 25.

In comparison with the case where pipe couplings 70a and 70b are directly attached to motor cover 202, pipe coupling block 70 with pipe couplings 70a and 70b is advantageous in increasing angle variation of pipe couplings 70a and 70b relative to fluid passages 60a and 60b and the like serving as fluid passages 24 and 25. Therefore, pipe coupling block 70 with pipe couplings 70a and 70b can be designed so that angles of pipes 23 (or 123) and 26 (or 126) coupled to respective pipe couplings 70a and 70b are optimized in relation to a later-discussed linkage for controlling the swash plate of hydraulic motor M3.

Alternatively, pipe coupling block 70 may be separated from motor cover 202 and supported on vehicle frame 3 or the like, so as to have pipes between pipe coupling block 70 and motor cover 202.

Figure 16:
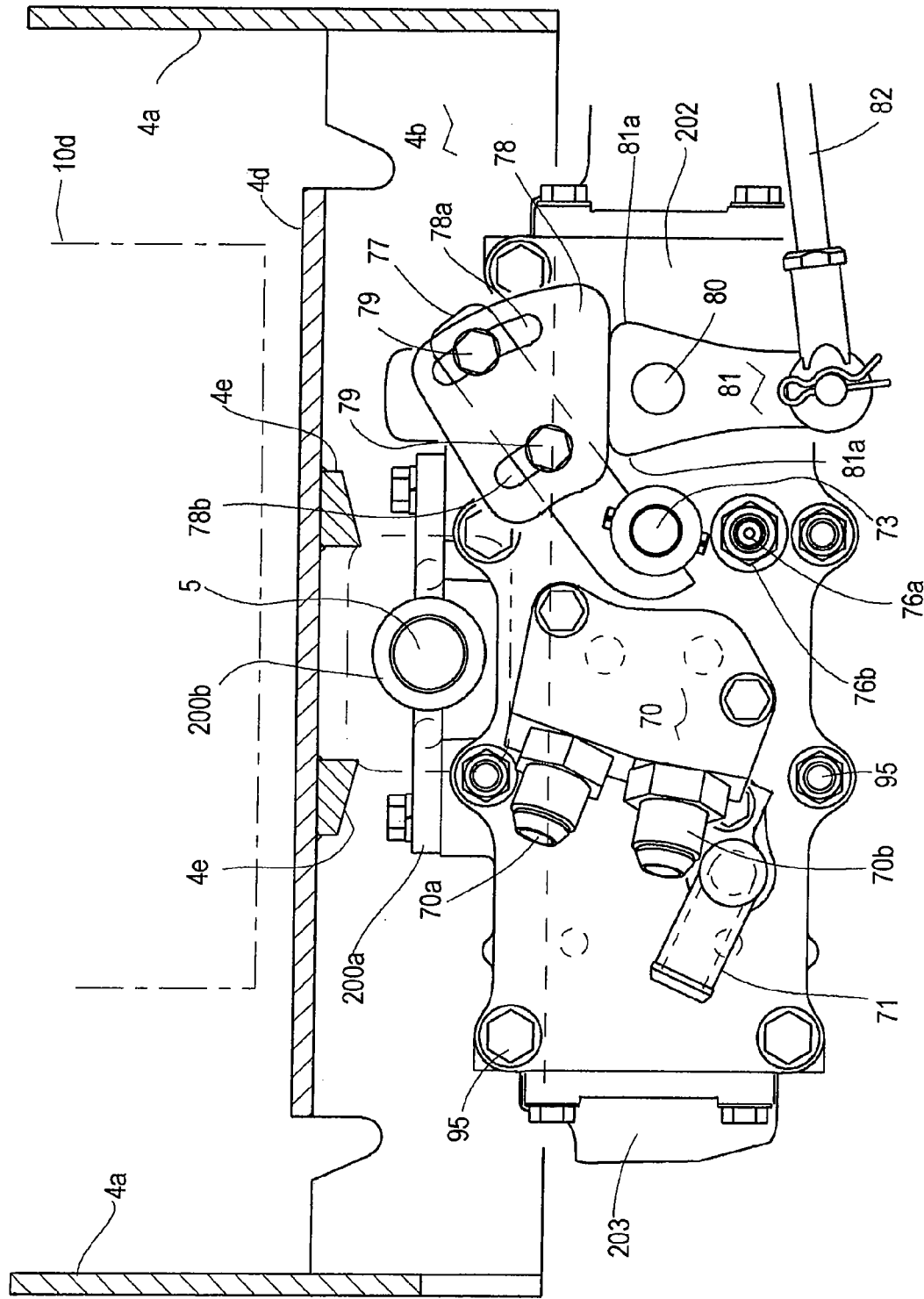
FIG. 16 is a rear view of a portion of the front transaxle, showing the motor casing.
Figure 18:
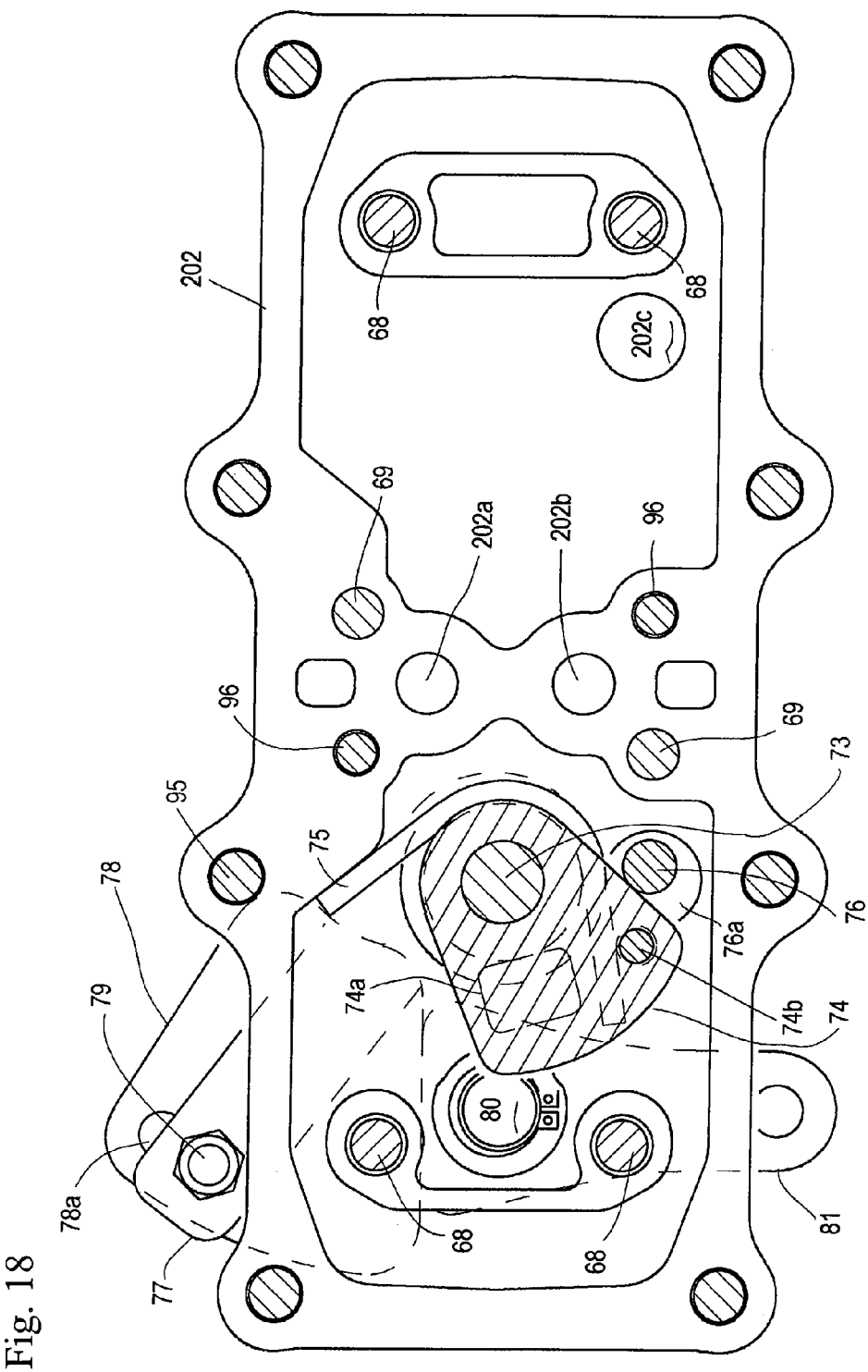
FIG. 18 is a front view partly in section of an inside portion of a motor cover covering a rear opening of the motor casing.

As shown in FIGS. 11, 15 and 16, a pipe coupling 71, serving as drain port 2c of each of HST circuits HC1 and HC2 shown in FIGS. 2 and 6, projects from the rear end surface of motor cover 202 adjacent to pipe coupling block 70 so as to be connected to reservoir tank 28 via drainpipe 30. As shown in FIG. 18, a drain hole 202c is bored through motor cover 202 between pipe coupling 71 and the fluid sump in motor casing 201. Therefore, excessively expanded fluid in the fluid sump in motor casing 201 can be drained to reservoir tank 28. Pipe coupling 71 is disposed in a space behind fixed displacement hydraulic motor M2, where the linkage for controlling the displacement of hydraulic motor M3 is not disposed.

As shown in FIG. 20, above-mentioned check valve 40 is disposed in center section 60 so as to be connected to kidney port 60c serving as a part of fluid passage 24 (and fluid passages 24a and 24b) which is hydraulically higher-pressurized in each of HST circuits HC1 and HC2 during forward travel of the vehicle. If kidney port 60c, i.e., fluid passage 24 is hydraulically depressed, check valve 40 is opened to introduce fluid from the fluid sump in motor casing 201 into fluid passage 24. Check valve 40 is provided with an oil filter 40a interposed between check valve 40 and kidney port 60c.

The linkage for controlling the displacement of hydraulic motor M3 will be described. As shown in FIGS. 15, 16 and 17, a fore-and-aft horizontal swash plate pivot shaft 73 is pivoted onto motor cover 202 in rear of hydraulic motor M3. In motor casing 201, an inner arm 74 is fixed on an inner (front) end of swash plate pivot shaft 73 and engages with movable swash plate 67 of hydraulic motor M3. In motor casing 201, a spring 75 is wound around swash plate pivot shaft 73 so as to return swash plate pivot shaft 73 and inner arm 74 to their initial position (that is, the swash plate angle setting position during straight travel of the vehicle).

Figure 19:
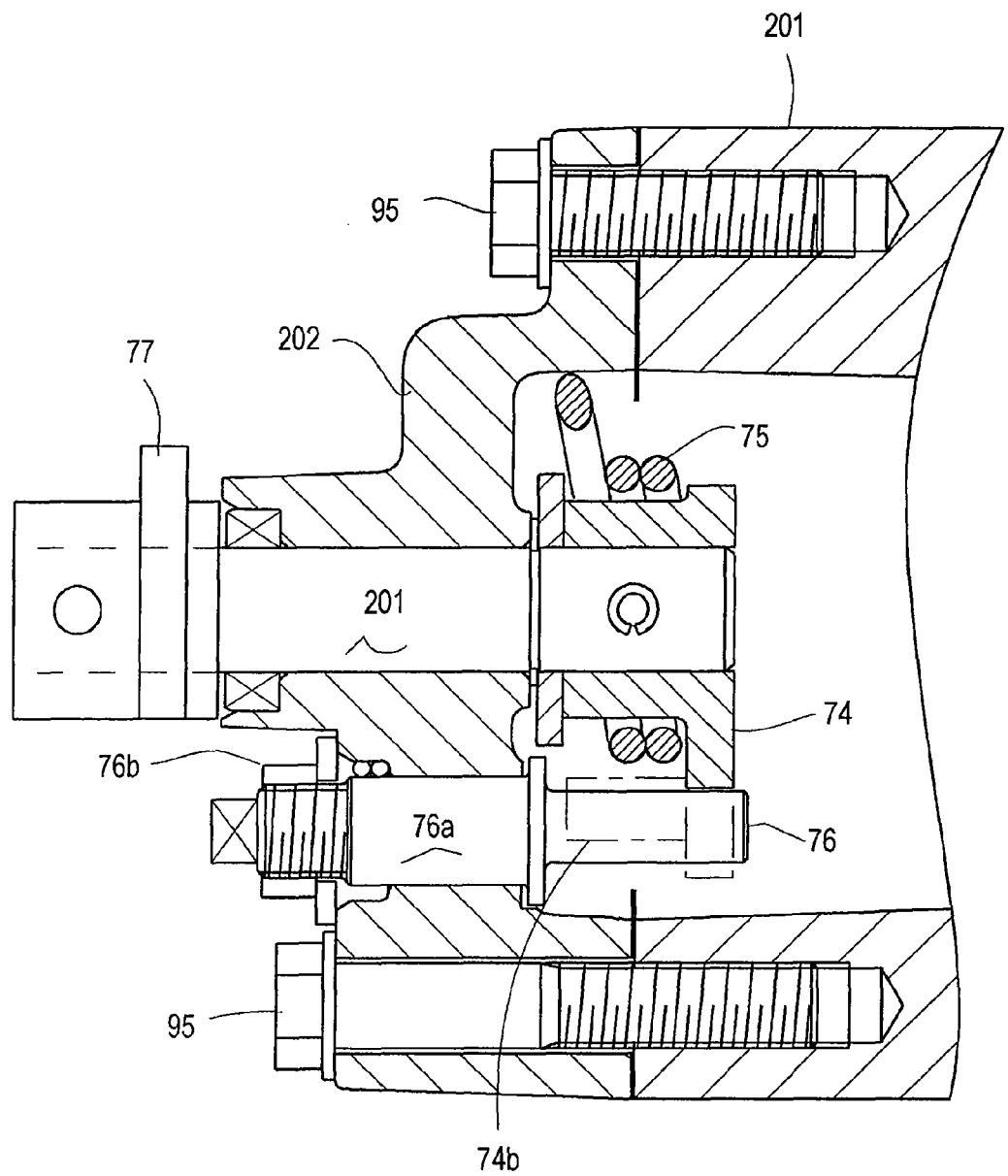
FIG. 19 is a fragmentary sectional side view of the motor casing and the motor cover supporting shafts for controlling displacement of the hydraulic motor.

As shown in FIGS. 18 and 19, inner arm 74 has a projection 74a fitted to swash plate 67. A pushpin 74b projects from inner arm 74. One end of spring 75 is constantly pressed against an inner surface of a wall of motor casing 202 so as to be retained. During turning of the vehicle, inner arm 74 is rotated for changing the displacement of hydraulic motor M3 so that pushpin 74b pushes the other end of spring 75 away from the retained end of spring 75, whereby spring 75 generates biasing force for returning inner arm 74 to the initial position. A stopper pin 76 is planted into a wall of motor casing 202 so as to abut against inner arm 74 disposed at the initial position. Stopper pin 76 is an eccentric pin, which is usually fastened to motor casing 202 by a nut 76b. By loosening nut 76b and revolving stopper pin 76 around its center axis portion 76a, the relative position of stopper pin 76 to inner arm 74 can be adjusted so as to adjust the initial position of inner arm 74 and swash plate pivot shaft 73, thereby canceling positional error of inner arm 74 and swash plate pivot shaft 73 relative to the initial slant angle position of swash plate 67.

As shown in FIGS. 11, 15, 16 and 18, a camshaft 80 is disposed in parallel to swash plate pivot shaft 73, and pivoted onto motor cover 202 on one of left and right sides of swash plate pivot shaft 73 (preferably, leftwardly or rightwardly outward from hydraulic motor M3) adjacent to swash plate pivot shaft 73. A cam plate 81 is fixed on an outer (rear) end of camshaft 80 on the outside of (in rear of) motor cover 202. Cam plate 81 has a pair of cam profiles 81a above camshaft 80. An upper edge of cam plate 81 between cam profiles 81a is disposed horizontally when cam plate 81 is disposed at the initial position. On the outside (in rear) of motor cover 202, an outer arm 77 is fixed on an outer (rear) end of swash plate pivot shaft 73. A pressure plate 78 is fixed on outer arm 77 so as to be pressed at a bottom edge thereof against the upper edge of cam plate 81.

Pressure plate 78 is fastened to outer arm 77 so as to be shiftable relative to outer arm 77, so that, when cam plate 81 is disposed at the initial position, the bottom edge of pressure plate 78 is disposed horizontally to abut against the upper edge of cam plate 81 regardless of the initial position of swash plate pivot shaft 73 with inner and outer arms 74 and 77 adjusted by stopper pin 76. In this regard, outer arm 77 is bored by a pair of bolt holes. One of the bolt holes is disposed toward a tip of outer arm 77, and the other toward a basal end of outer arm 77. As shown in FIG. 16, a pair of bolts 79 screwed into the respective bolt holes of outer arm 77 are passed through respective slots 78a and 78b bored in pressure plate 78. Nuts are screwed on respective bolts 79 so as to fasten outer arm 77 and pressure plate 78 together. By loosening the nuts and adjusting positions of bolts 79 in slots 78a and 78b, the position of pressure plate 78 relative to outer arm 77 can be adjusted. Due to this construction, the present linkage for controlling the displacement of hydraulic motor M3 can be adapted to various vehicles having different steering angle settings.

Cam plate 81 is extended downward from camshaft 80. An acceleration rod 82 is pivotally connected at one end thereof to a bottom end of downwardly extended cam plate 81. Acceleration rod 82 is pivoted at the other end thereof onto one of left and right steerable casings 205. Preferably, the other end of acceleration rod 82 is pivoted onto a pivot pin 83 (as best shown in FIGS. 10 and 11), which is planted into a wall of steerable casing 205 supporting front wheel 9 drivingly connected to variable displacement hydraulic motor M3. In this way, steered steerable casings 205 are rotated leftward or rightward centered on respective kingpin casings 203 so as to push or pull acceleration rod 82, thereby swinging the bottom end of cam plate 81 leftward or rightward. Accordingly, the upper edge of cam plate 81 is slanted so that one of cam profiles 81a rises to push up pressure plate 78. Consequently, outer arm 77 are rotated upward so as to integrally rotate swash plate pivot shaft 73 and inner arm 74, thereby reducing the tilt angle of swash plate 67 of hydraulic motor M3.

As shown in FIGS. 10 and 11, acceleration rod 82 has an intermediate spline collar 82a so as to be telescoped in correspondence to the above-mentioned tread adjustment by interposition of a spacer between motor casing 201 and any of axle casings 203.

In this way, the cam system including cam plate 81 and pressure plate 78 abutting against each other, and arms 77 and 74 connected to pressure plate 78 so as to rotate integrally with movable swash plate 67 constitute the linkage for moving swash plate 67 of hydraulic motor M3 according to lateral rotation of steerable casings 205 during turning of the vehicle. The linkage is disposed on the outer surface of motor cover 202 in rear of variable displacement hydraulic motor M3. Pipe coupling block 70 is disposed on the outer surface of motor cover 202 in rear of the portion between hydraulic motors M2 and M3 adjacent to the linkage.

It is now assumed that both the hydraulic motors in front transaxle 2 are variable displacement hydraulic motors M3. The linkage must have a cam system for converting the push-and-pull movement of a rod for the lateral rotation of steerable casings 205 into rotation of movable swash plates 67 of both hydraulic motors M3. Therefore, the linkage must be complicated and large so as to substantially entirely cover the outer surface of motor cover 202 (the rear surface of front transaxle 2) in the left-and-right direction. Accordingly, a port member having ports for fluidly connecting both hydraulic motors M3 to hydraulic pump P and motor M1 (such as pipe coupling block 70) has to be disposed on a surface of rear transaxle 2, which is different from the outer surface of motor cover 202. For instance, the port member has to be attached to the front surface of front transaxle 2 opposite to the outer surface of motor cover 202. Pipes to be connected to the port member have to be extended along or beyond motor casing 201.

However, in front transaxle 2 of the present embodiment, one of the pair of hydraulic motors therein is fixed displacement hydraulic motor M2. The linkage for angle controlling of movable swash plate 67 does not have to be disposed on the outer (rear) surface of motor cover 202 in rear of hydraulic motor M2 or in rear of the portion between hydraulic motors M2 and M3, thereby ensuring a space in rear of the rear surface of front transaxle 2 for attaching pipe coupling block 70 and drain pipe coupling 71. Due to pipe coupling block 70 disposed at this position, pipes connected to front transaxle 2 from rear transaxle 1 (or from pump unit 50 and front transaxle 101) are streamlined so as to increase fluid circulation efficiency, and to reduce interference thereof with other parts or members.

A drive train from each motor shaft 61 to corresponding front wheel 9 will be described. As shown in FIG. 12, motor shaft 61 of each of hydraulic motors M2 and M3 freely rotatably passes through thrust bearing 62 and swash plate support 65 or 66 so as to be connected to coaxial axle 8 supported in axle casing 203. Facing ends of motor shaft 61 and axle 8 are spline-fitted into a bush 85 disposed in a proximal end portion of axle casing 203 from opposite openings of bush 85, whereby coaxial motor shaft 61 and axle 8 are integrally rotatably connected to each other. Alternatively, single motor shaft 61 may be extended into axle casing 203 so as to serve as axle 8.

Figure 13:
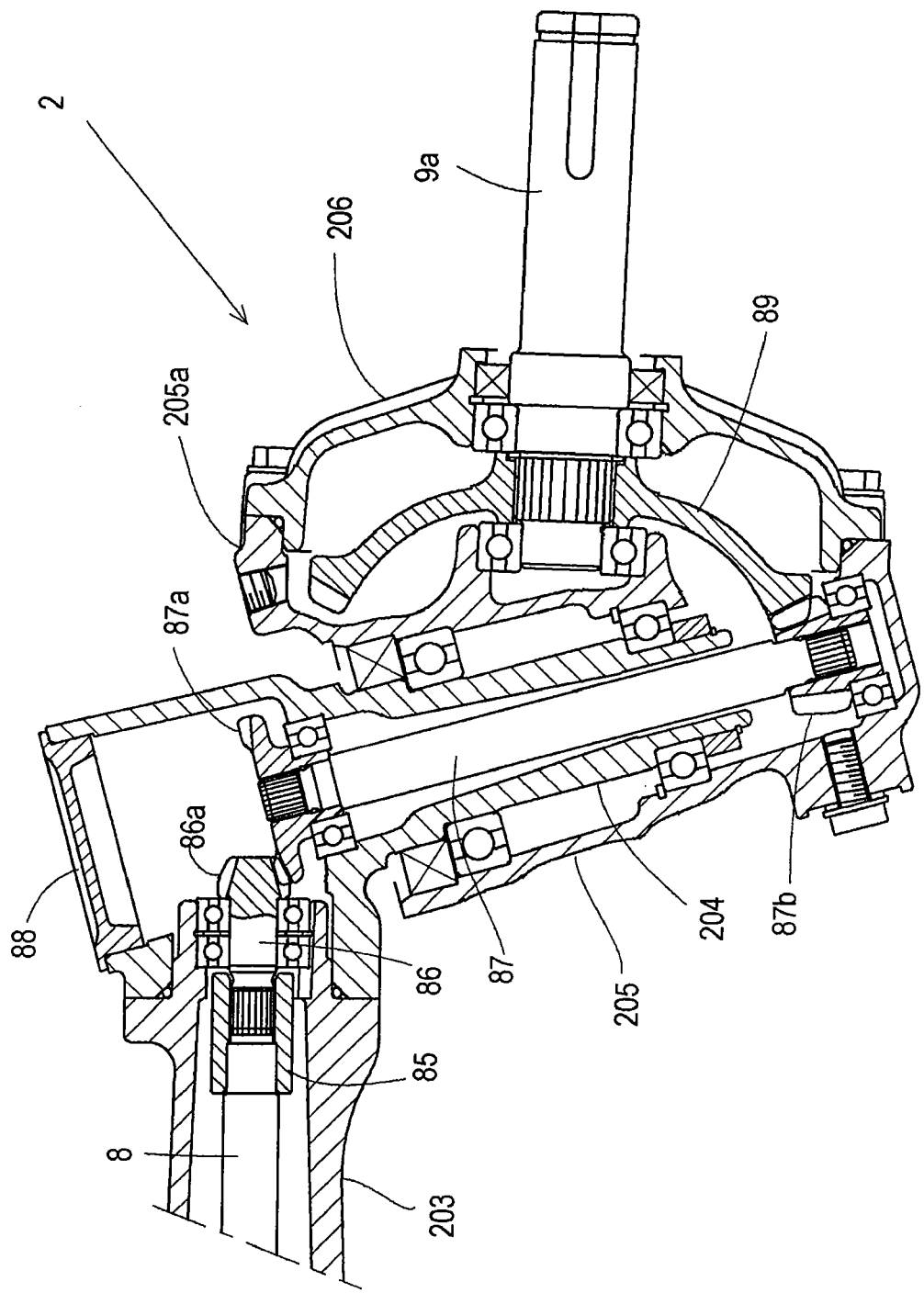
FIG. 13 is an enlarged sectional front view of the front transaxle, showing a steerable casing thereof.

As best shown in FIG. 13, a bevel gear shaft 86 is journalled by a distal end portion of axle casing 203. A distal end of axle 8 and a proximal end of bevel gear shaft 86 are spline-fitted into bush 85 disposed in the distal end portion of axle casing 203 from opposite openings of bush 85, wherein coaxial axle 8 and bevel gear shaft 86 are integrally rotatably connected to each other. The distal end portion of axle casing 203 projects into kingpin casing 204, so that a distal end of bevel gear shaft 86, formed thereon with a bevel gear 86a, projects from axle casing 203 into an upper portion of kingpin casing 204. A kingpin center shaft 87 is rotatably passed through the downwardly extended portion of kingpin casing 204. A bevel gear 87a is fixed on a top of kingpin center shaft 87 in the upper portion of kingpin casing 204, so as to mesh with bevel gear 86a.

A top opening of kingpin casing 204 facing the inner space of kingpin casing 204, in which meshing bevel gears 86a and 87a are disposed, is wide so as to be adapted for economically forming kingpin casing 204 by die casting. Further, the wide opening facilitates easy and accurate forming of bearing grooves in the inner wall surface of kingpin casing 204. The opening is closed by a grommet after the bevel gears and others are completely disposed in kingpin casing 204.

The downwardly extended portion of kingpin casing 204 is inserted into steerable casing 205. Steerable casing 205 relatively rotatably supports the downwardly extended portion of kingpin casing 204 therein with bearings. In other words, steerable casing 205 is laterally rotatable around kingpin casing 204. Kingpin center shaft 87 is extended downward from a bottom end of kingpin casing 204, and fixedly provided on a bottom end thereof with a bevel gear 87b in steerable casing 205 below kingpin casing 204. Bevel gear 87b is journalled by a bottom portion of steerable casing 205.

A bearing cover support portion 205a is formed on a lateral distal end of steerable casing 205 so as to journal a proximal end of a center axis shaft 9a of front wheel 9 in a center hole thereof. A diametrically large bevel gear 89 is fixed on center axis shaft 9a and meshes with bevel gear 87b. A bearing cover 206 is fastened to bearing cover support portion 205a so as to cover bevel gear 89. Center axis shaft 9a is extended distally outward from bevel gear 89 so as to be pivoted onto bearing cover 206 via bearings, and further extended distally outward from bearing cover 206 so as to be connected at a distal end thereof to front wheel 9.

In this way, front wheels 8 can be steered by rotating steerable casing 205 around kingpin casing 204 while receiving the output force of respective hydraulic motors M2 and M3 through respective motor shafts 61, axles 8 and kingpin center shafts 87.

As mentioned above, the entire casing of front transaxle 2 is formed by joining motor casing 201 (with motor cover 202), left and right axle casings 203, kingpin casings 204, steerable casings 205 and bearing covers 206 to one another. A bearing for journaling a shaft is disposed at a junction between any adjoining casings of rear transaxle 2. The bearing is provided with no oil seal. In this regard, lube (also used as operation fluid for the HST) filled in motor casing 201, axle casings 203, kingpin casings 204, steerable casings 205 and bearing covers 206 can freely pass among these casings and covers. The costs for oil seals are saved. Oiling ports to fill entire front transaxle 2 with fluid (lube) can be reduced, and even only a single oiling port can be provided. Further, the total amount of fluid and the total surface area of hydraulic devices are increased so as to suppress heating of the hydraulic devices, thereby improving the hydraulic devices in endurance and mechanical efficiency.

The linkage from steering wheel 12 to steerable casing 205 will be described with reference to FIGS. 2 and 21. A steering link bracket 207 is fixed on one of steerable casings 205 so as to cover the top surface of this steerable casing 205. Preferably, steerable casing 205 having no acceleration rod 82 connected thereto is provided with steering link bracket 207, so as to prevent steering link bracket 207 from interfering with acceleration rod 82 and the like. A drag rod 90 is extended in parallel to an outer side surface of vehicle frame 3, and pivotally connected at a front end thereof to steering link bracket 207. A gearbox 12b is provided on a bottom end of a stem 12a (see FIG. 2) of steering wheel 12, and an arm 12c is fore-and-aft rotatably attached onto an output end of gearbox 12b. Drag rod 90 is pivotally connected at a rear end thereof to a free tip of arm 12c. Drag rod 90 may be replaced with a hydraulic power steering cylinder. Preferably, drag rod 90 or the hydraulic power steering cylinder is disposed substantially in parallel to vehicle frame 3.

As best shown in FIGS. 10 and 11, steering casing 205 on variable displacement hydraulic motor M3 side and steering casing 205 on fixed displacement hydraulic motor M2 are connected to each other via tie rod 84 so as to be laterally rotatable substantially integrally with each other. An end of tie rod 84 toward steering casing 205 on variable displacement hydraulic motor M3 side is pivoted onto pivot pin 83. Preferably, pivot pin 83 is stepped so that upper and lower portions of pivot pin 83, onto which accelerator rod 82 and tie rod 84 are pivotally connected respectively, have different diameters. In this way, ends of accelerator rod 82 and tie rod 84 are pivoted on common pivot pin 82, so as to save the parts count, and to prevent rods 82 and 84 from intercrossing each other hindering their own movement and movement of steerable casing 205.

Referring to FIGS. 1, 16, 20 and others, a structure for supporting front transaxle 2 onto vehicle frame 3 will be described. Upright stays 201a are disposed at optimal positions (e.g., four stays 201a are disposed at the front, rear, right and left) on a top surface of motor casing 201, and a center pin boss member 200 is mounted over all stays 201a. Center pin boss member 200 includes a horizontal plate portion 200a, which is integrally formed at the lateral center portion thereof with a fore-and-aft axial boss portion 200b. Four corners of plate portion 200a are screwed onto respective stays 201a. Center pin 5 is freely rotatably passed through a boss hole of boss portion 200b.

Some different designed center pin brackets 200 are prepared, and one corresponding to relative pivot positions of front transaxle 2 in a vehicle is selected to be fastened to stays 201a of motor casing 201. Therefore, front transaxle 2 can be standardized for various designed vehicles.

Center pin 5 is journalled at front and rear ends thereof by front axle bracket 4 fixed on the front end of vehicle frame 3. Front axle bracket 4 comprises a pair of left and right vertical side plates 4a, a vertical rear plate 4b connecting side plates 4a to each other, a front plate 4c, and a horizontal plate 4d connected between rear and front plates 4b and 4c.

Each of left and right side plates 4a has bolt holes 4h bored in a rear end portion thereof. Bolts are passed through bolt holes 4h of left and right side plates 4a so as to fasten left and right side plates 4a onto front end portions of respective left and right side plate portions of vehicle frame 3, thereby fixing front axle bracket 4 onto the front end portion of vehicle frame 3. Center pin 5 passed through center pin bracket 5 is journalled at the rear end portion by rear plate 4b, and at the front end portion by front plate 4c. Therefore, front transaxle 2 is swingably supported. Flexibility of hydraulic fluid hoses 23a and 26a permits the swing of front transaxle 2.

In this state, horizontal plate 4d covers the top of motor casing 201 disposed in front of the front end of vehicle frame 3. A pair of left and right stoppers 4e are hung down from the bottom surface of horizontal plate 4d. The position where one of stoppers 4e abuts against the top of plate portion 200a of center pin bracket 200 fixed on front transaxle 2 is defined as the limit swing position of front transaxle 2 centered on center pin 5. Stoppers 4e also serve as ribs for reinforcing horizontal plate 4d.

Further, horizontal plate 4d is at a lower degree than the top of the front end of vehicle frame 3. An engine muffler 10d is mounted on horizontal plate 4d, so as to be covered at a rear portion thereof with rear plate 4b, and at left and right end portions thereof with left and right side plates 4a. In this way, a suitable space for efficient radiation of engine muffler 10d is ensured in front axle bracket 4. Further, horizontal plate 4d protects front transaxle 2 from the heat radiated from engine muffler 10d.

As shown in FIG. 20, front ends of left and right side plates 4a are extended upwardly forward so as to serve as bonnet brackets 4f for supporting a pivot shaft for opening and closing bonnet 11. The pivot shaft is passed through holes 4g formed in bonnet brackets 4f. A rear end of bonnet 11 can be rotated upward centered on the pivot shaft so as to open engine 10 mounted on vehicle frame 3. Front axle bracket 4 can be fastened by bolts, or joined by welding, to a front end of a vehicle frame for a two-wheel drive vehicle, thereby platforming the vehicle frame for both two-wheel drive vehicles and four-wheel drive vehicles.

A part of each side plate 4a adjacent to corresponding bonnet bracket 4f is cut off and bent laterally inward of the vehicle so as to form a spring stay 4j, onto which an end of a spring for biasing bonnet 11 to its initial closed position is connected.

As shown in FIGS. 1, 4 and 7, mower lifting cradles 91 are extended downward from front ends of respective side plates 4a so as to guide the vertical movement of mower 20. Link rods 91a are extended rearward from respective cradles 91 and connected to mower 20. Plurality of bolt holes are bored in each of cradles 91. On the other hand, as shown in FIG. 20, a bolt hole 4k is bored in each side plate 4 below spring stay 4j. Each cradle 91 is disposed so as to selectively coincide one of the bolt holes thereof to bolt hole 4k, and fastened to each side plate 4a by a bolt through the selected bolt hole thereof and bolt hole 4k. In this way, the vertical position of mower 20 relative to front axle bracket 4 can be adjusted by selecting one of the bolt holes in each cradle 91.

Front axle bracket 4 may be replaced with a simple vertical plate covering the front end of vehicle frame 3, if the vehicle is a two-wheel drive vehicle having no front transaxle 2 incorporating the pair of hydraulic motors.

Figure 21:
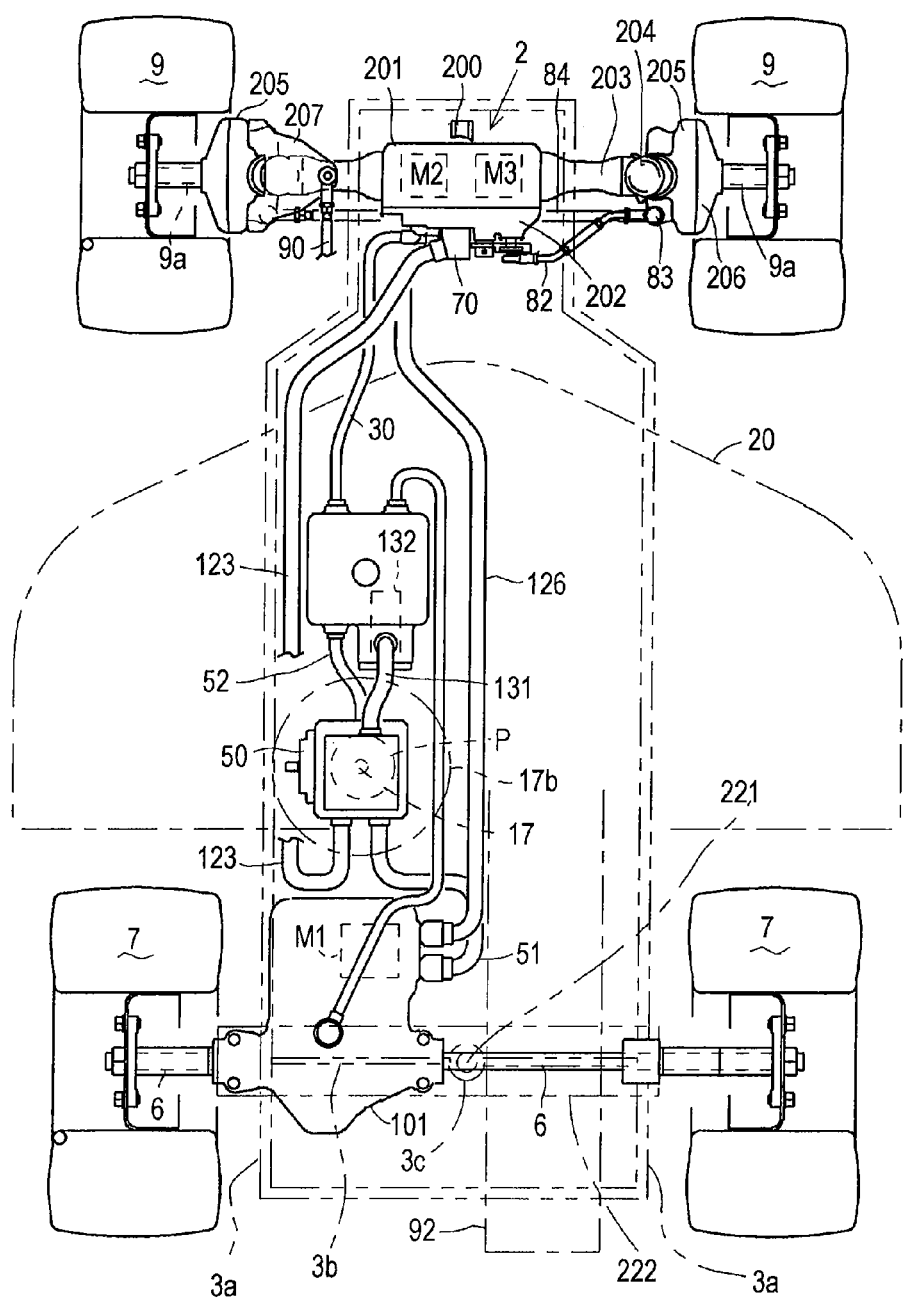
FIG. 21 is plan view of the four-wheel lawn tractor according to the second embodiment of the present invention, employing a system for steering rear wheels.
Figure 22:
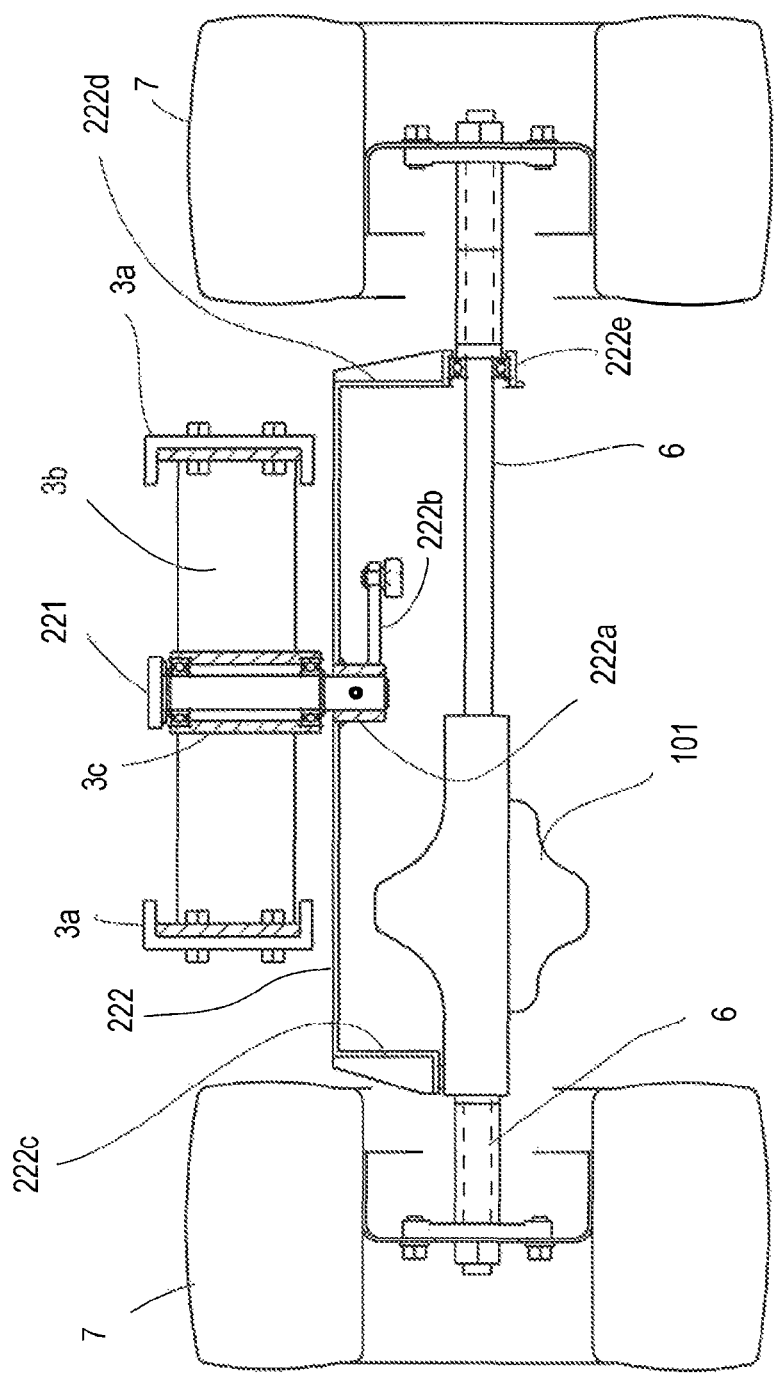
FIG. 22 is a rear view of the rear wheel steering system of FIG. 21.
Figure 23:
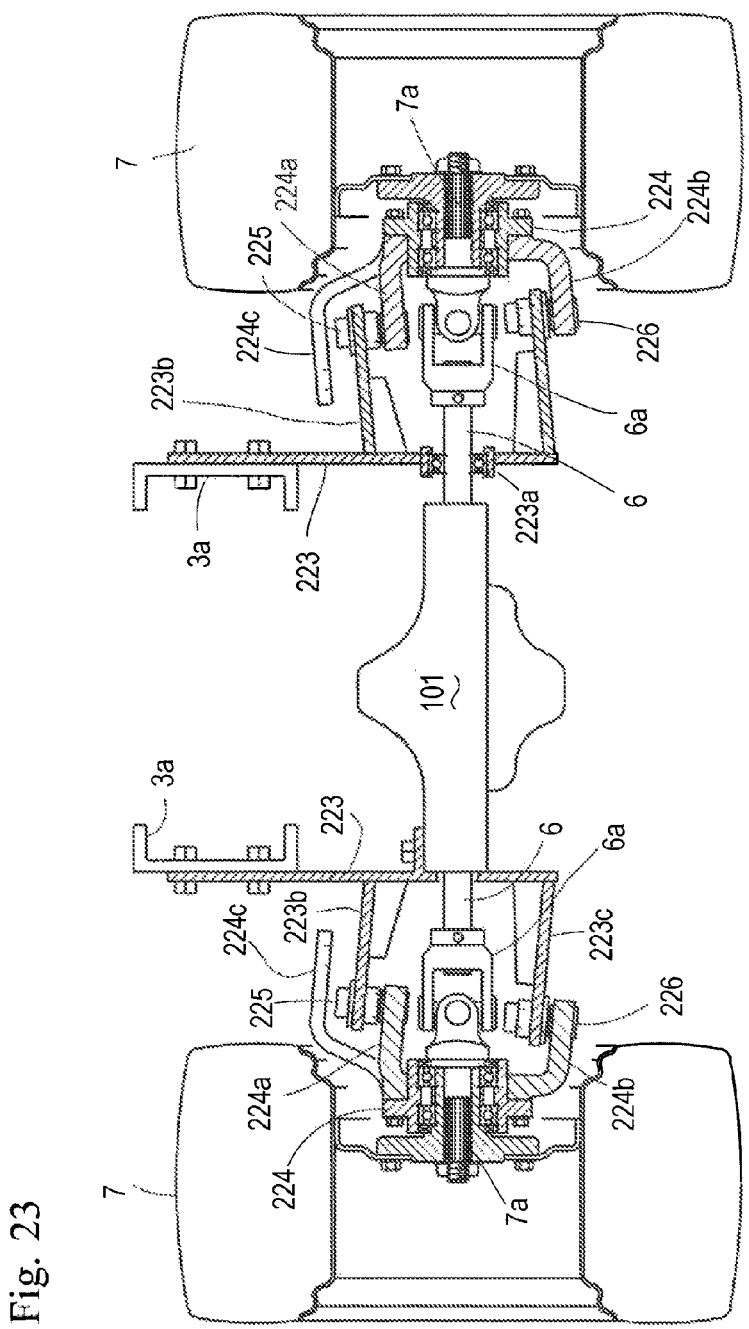
FIG. 23 is a rear view of another rear wheel steering system.

Referring to FIGS. 21 to 23, two type rear-wheel steering systems will be described. These steering systems are applicable to the respective four-wheel drive lawn tractors according to the first embodiment shown in FIGS. 1 and 2, the second embodiment shown in FIGS. 4 and 5, and the third embodiment shown in FIGS. 7 and 8. The rear-wheel steering system shown in FIGS. 21 and 22 is applied to the lawn tractor as shown in FIGS. 4 and 5, having separate pump unit 50 and rear transaxle 101. However, as shown in FIGS. 1 and 2, rear transaxle 1 can be applied to a lawn tractor having rear transaxle 1 incorporating hydraulic pump P, such as the lawn tractor shown in FIGS. 1 and 2.

Referring to the rear-wheel steering system of FIGS. 21 and 22, a connection portion 3b is connected between left and right side plates 3a of vehicle frame 3. Connection portion 3b is provided at the lateral center portion thereof with a bearing portion 3c. A vertical pivot shaft 221 is journalled by bearing portion 3c. A rear axle support frame 222 has a laterally central boss 222a, into which pivot shaft 221 extended downward from bearing portion 3c is inserted and fixed. A horizontal arm 222b is extended from boss 222a so as to be interlockingly connected to steering wheel 12. Rear axle support frame 222 has laterally opposite first and second end portions 222c and 222d. First end portion (in this embodiment, the left end portion) 222c of rear wheel support frame 222 is extended downward, and fastened at the bottom end portion thereof to one of left and right end portions (in this embodiment, the left end portion) of the casing of rear transaxle 101. Second end portion (in this embodiment, the right end portion) 222d of rear wheel support frame 222 is extended downward, and provided at the bottom thereof with a bearing 222e for longer axle 6 (in this embodiment, right axle 6) extended outward from rear transaxle 101. A space for duct 92 extended from mower 20 is ensured below axle 6 between bearing 222e and the other right or left end portion (in this embodiment, the right end portion) of rear transaxle 101.

Rear transaxle 101 has longer and shorter axles 6. Shorter axle 6 is extended laterally outward from the end portion of the casing of rear transaxle 101 fastened to the bottom of first end portion 222c of rear wheel support frame 222, and fixed at the distal end thereof to one rear wheel 7. Longer axle 6 is further extended laterally outward from bearing 222e, and fixed at the distal end thereof to the other rear wheel 7.

Therefore, by rotating steering wheel 12, rear wheel support frame 222 rotates integrally with rear transaxle 101, left and right axles 6 and rear wheels 7 relative to vehicle frame 3 centered on pivot shaft 221, thereby steering rear wheels 7.

A structure of rear wheel support frame 222, and a structure of the casing of rear transaxle 101 with axles 6 to be supported by rear wheel support frame 222 may be different from those shown in FIGS. 21 and 22. The only important thing for this embodiment is to make the casing of rear transaxle 101 with axles 6 horizontally rotatable relative to vehicle frame 3 according to operation of steering wheel 12 while ensuring the driving of axles 6.

Referring to the rear wheel steering system of FIG. 23, rear wheel support frames 223 are fixed onto respective left and right side plates 3a of vehicle frame 3. Each rear wheel support frame 223 has a portion extended downward from the bottom end of corresponding side plate 3a. The downwardly extended portion of rear wheel support frame 223 may be fastened to an end portion of the casing of rear transaxle 101 while avoiding interference thereof with corresponding axle 6 (axle 6 may be freely rotatably passed through the downwardly extended portion of rear wheel support frame 223), as the downwardly extended portion of left rear wheel support frame 223 in FIG. 23 is so. Otherwise, the downwardly extended portion of rear wheel support frame 223 may be provided with a bearing portion 223a for journaling corresponding axle 6, as the downwardly extended portion of right rear wheel support frame 223 in FIG. 23 is so provided. Both left and right rear wheel support frames 223 may be fastened to the casing of rear transaxle 101. Alternatively, both left and right rear wheel support frames 223 may be provided with respective bearing portions 223a for respective axles 6. The important distinction of this steering system of FIG. 23 from the above steering system of FIGS. 21 and 22 is that the casing of rear transaxle 101 is fixed to vehicle frame 3 regardless of steering of rear wheels 7.

An upper kingpin support portion 223b and a lower kingpin support portion 223c are extended laterally outward from each rear wheel support frame 223. The distal end of each axle 6 extended outward from the casing of rear transaxle 101 is disposed between upper and lower kingpin support portions 223b and 223c. The distal end of axle 6 is connected to center axis shaft 7a of rear wheel 7 via a universal joint 6a, so that rear wheel 7 with center axis shaft 7a can be substantially horizontal relative to axle 6.

Center axis shaft 7a is journalled in a bearing block 224. An upper arm 224a is extended from an upper portion of bearing block 224 so as to be pivotally connected to upper kingpin support portion 223b via a kingpin 225. A lower arm 224b is extended from a lower portion of bearing block 224 so as to be pivotally connected to lower kingpin support portion 223c via a kingpin 226. Upper and lower kingpins 225 and 226 are disposed coaxially, and the pivot of universal joint 6a is coaxially disposed between upper and lower kingpins 225 and 226.

A tie rod (not shown) is interposed between tie rod stays 224c extended from respective upper portions of bearing blocks 224, and connected to steering wheel 12. By rotating steering wheel 12, left and right bearing blocks 224 are substantially horizontally rotated around respective kingpins 225 and 226 so as to steer left and right rear wheels 7.

The hydrostatic transaxle and the hydraulically driven vehicle of the present invention are applicable to various vehicles such as working vehicles including disclosed lawn tractors. The illustrated vehicles have Ackerman-type steering systems. However, the peripheral speed setting of front and rear wheels, the structure of the hydraulic pump unit separated from the front and rear transaxles, and the like are applicable to vehicles having different steering systems, such as an articulated vehicle.

It is further understood by those skilled in the art that the foregoing description is a preferred embodiment of the disclosed apparatus and that various changes and modifications may be made in the invention without departing from the spirit and scope thereof.

What is claimed is:
1. A hydraulically driven vehicle, comprising:
  a first transaxle disposed at one of front and rear portions of the vehicle, wherein the first transaxle incorporates a first hydraulic motor for driving a first axle;
  a second transaxle disposed at the other of the rear and front portions of the vehicle, wherein the second transaxle incorporates a second hydraulic motor for driving a second axle;
  a hydraulic pump for supplying fluid to the first and second hydraulic motors;
  a mower;
  a duct for transferring grass mowed by the mower, wherein the duct has an upper surface sloped in the fore-and-aft direction of the vehicle, and wherein the first transaxle is disposed above the duct so that a bottom surface of the first transaxle is sloped along the upper surface of the duct; and
  a vertical power train interposed between the first axle and an axial center shaft of a wheel driven by the first axle, wherein the power train is disposed on a lateral outside of the duct.

2. The hydraulically driven vehicle according to claim 1, further comprising:
  a vehicle frame; and
  an engine for driving the hydraulic pump, wherein both the engine and the hydraulic pump are vibro-isolatingly mounted on the vehicle frame.

3. The hydraulically driven vehicle according to claim 1, wherein the hydraulic pump is provided with a cooling fan.

4. The hydraulically driven vehicle according to claim 3, wherein at least one of the first and second transaxles is disposed in an area blown by cooling wind generated from the cooling fan of the hydraulic pump.

5. The hydraulically driven vehicle according to claim 3, further comprising:

a pipe for circulating fluid supplied to the first and second hydraulic motors, wherein the pipe is partly disposed in an area blown by cooling wind generated from the cooling fan of the hydraulic pump.

6. The hydraulically driven vehicle according to claim 3, further comprising:
a reservoir tank disposed adjacent to the hydraulic pump; and
a pipe connecting the reservoir tank to at least one of the hydraulic pump and the first and second transaxles, wherein the pipe is disposed in an area blown by cooling wind generated from the cooling fan of the hydraulic pump.

7. The hydraulically driven vehicle according to claim 3, wherein the hydraulic pump is disposed between the first and second transaxles.

8. The hydraulically driven vehicle according to claim 3, wherein the first transaxle is disposed between the hydraulic pump and the second transaxle.

9. The hydraulically driven vehicle according to claim 1, wherein the vertical power train is extended so that the first axle is offset from the axial center shaft of the wheel in the fore-and-aft direction of the vehicle.

10. The hydraulically driven vehicle according to claim 1, wherein the first hydraulic motor is vertically aligned above the duct.

11. A hydraulically driven vehicle, comprising:
a first transaxle disposed at one of front and rear portions of the vehicle, wherein the first transaxle incorporates a first hydraulic motor for driving a first axle;
a second transaxle disposed at the other of the rear and front portions of the vehicle, wherein the second transaxle incorporates a pair of second hydraulic motors for driving respective second axles, and wherein each of the second hydraulic motors has a fixed displacement;
a first drive wheel disposed at one of the front and rear portions of the vehicle and driven by the first axle;
a hydraulic pump for supplying fluid to the first and second hydraulic motors;
a mower;
a duct for transferring grass mowed by the mower, wherein the first transaxle is disposed above the duct;
a vertical power train interposed between the first axle and an axial center shaft of the first drive wheel driven by the first axle, wherein the power train is disposed on a lateral outside of the duct;
a pair of second steerable drive wheels disposed at the other of the rear and front portions of the vehicle, and drivingly connected to the respective second axles, wherein a peripheral speed of the first drive wheel is set to be equal to peripheral speeds of the second drive wheels, or to be slightly larger than peripheral speeds of the second drive wheels, during straight traveling of the vehicle; and
a hydraulic circuit fluidly connecting the first hydraulic motor and the pair of second hydraulic motors in series to the hydraulic pump, and fluidly connecting the second hydraulic motors to the hydraulic pump in parallel to each other, wherein the hydraulic circuit includes a supply portion from which fluid is supplied to the pair of second hydraulic motors, and includes a check valve disposed in the supply portion so as to introduce fluid into the hydraulic circuit from outside of the hydraulic circuit.

12. A hydraulically driven vehicle, comprising:
a first transaxle disposed at one of front and rear portions of the vehicle, wherein the first transaxle incorporates a first hydraulic motor for driving a first axle;
a second transaxle disposed at the other of the rear and front portions of the vehicle, wherein the second transaxle incorporates a second hydraulic motor for driving a second axle, and incorporates a third hydraulic motor for driving another second axle, wherein the second hydraulic motor has a fixed displacement, and the third hydraulic motor has a variable displacement;
a first drive wheel disposed at one of the front and rear portions of the vehicle and driven by the first axle;
a hydraulic pump for supplying fluid to the first and second hydraulic motors;
a mower;
a duct for transferring grass mowed by the mower, wherein the first transaxle is disposed above the duct;
a vertical power train interposed between the first axle and an axial center shaft of the first drive wheel driven by the first axle, wherein the power train is disposed on a lateral outside of the duct; and
a pair of second steerable drive wheels disposed at the other of the rear and front portions of the vehicle, and drivingly connected to the respective second axles, wherein the variable displacement of the third hydraulic motor is changed according to turning angles of the second steerable drive wheels when the second steerable drive wheels are steered.

* * * * *